US008788311B2

(12) United States Patent
Fleurant et al.

(10) Patent No.: US 8,788,311 B2
(45) Date of Patent: Jul. 22, 2014

(54) QUALITY CONTROL OF AUTHORING WORK FLOW WITHIN A BENEFITS CONTENT SYSTEM

(75) Inventors: Karen Fleurant, Worcester, MA (US); Remo Politano, Shrewsbury, MA (US); Jason Bennett, Hudson, MA (US)

(73) Assignee: FMR LLC, Boston, MA (US)

( * ) Notice: Subject to any disclaimer, the term of this patent is extended or adjusted under 35 U.S.C. 154(b) by 3401 days.

(21) Appl. No.: 11/107,326

(22) Filed: Apr. 15, 2005

(65) Prior Publication Data

US 2006/0235737 A1 Oct. 19, 2006

(51) Int. Cl.
*G06Q 10/10* (2012.01)
*G06Q 10/06* (2012.01)

(52) U.S. Cl.
CPC .......... *G06Q 10/10* (2013.01); *G06Q 10/06395* (2013.01); *G06Q 10/06316* (2013.01)
USPC .......................................................... 705/7.26

(58) Field of Classification Search
USPC .............................................................. 705/1
See application file for complete search history.

(56) References Cited

U.S. PATENT DOCUMENTS

| | | | |
|---|---|---|---|
| 5,600,554 | A | 2/1997 | Williams |
| 5,675,802 | A | 10/1997 | Allen et al. |
| 5,893,906 | A | 4/1999 | Daffin et al. |
| 5,940,834 | A | 8/1999 | Pinard et al. |
| 5,941,947 | A | 8/1999 | Brown et al. |
| 5,966,715 | A | 10/1999 | Sweeney et al. |
| 5,974,412 | A | 10/1999 | Hazlehurst et al. |
| 5,983,227 | A | 11/1999 | Nazem et al. |
| 5,987,480 | A | 11/1999 | Donohue et al. |
| 6,014,678 | A | 1/2000 | Inoue et al. |
| 6,026,433 | A | 2/2000 | D'Arlach et al. |
| 6,088,702 | A | 7/2000 | Plantz et al. |
| 6,122,741 | A | 9/2000 | Patterson et al. |
| 6,134,552 | A | 10/2000 | Fritz et al. |

(Continued)

FOREIGN PATENT DOCUMENTS

| | | |
|---|---|---|
| EP | 1 130 543 A2 | 5/2001 |
| WO | 99/26122 | 5/1999 |

OTHER PUBLICATIONS

"Administering Enterprise User Security," Oracle9*i* Security Overview (4 pages). http://www.csis.gvsu.edu/GeneralInfo/Oracle/network.920/a96582/entusers.htm, Date Unknown—at least as early as 2002.

Shahnam, Liz, "Teradata CRM," (pp. 1-4), 2001.

(Continued)

*Primary Examiner* — Bruce I Ebersman
(74) *Attorney, Agent, or Firm* — Proskauer Rose LLP

(57) ABSTRACT

A first change request is generated in a work flow process to implement a first change to a portion of content within the benefits content system. A first status indicator, indicating whether the first change has passed a quality check, is associated with the first change request. A second status indicator, indicating whether the first status indicator should be overridden, is associated with the first change request. The first change request is moved to a next step in the work flow process if the associated first status indicator indicates the first change has passed the quality check. The first change request is moved to the next step in the work flow process if the associated first status indicator indicates the first change has failed the quality check and the associated second status indicator indicates that the first status indicator should be overridden.

11 Claims, 22 Drawing Sheets

(56) References Cited

U.S. PATENT DOCUMENTS

| | | | | |
|---|---|---|---|---|
| 6,212,178 | B1 | 4/2001 | Beck et al. | |
| 6,230,173 | B1 | 5/2001 | Ferrel et al. | |
| 6,304,886 | B1 | 10/2001 | Bernardo et al. | |
| 6,327,594 | B1 | 12/2001 | Van Huben et al. | |
| 6,330,610 | B1 | 12/2001 | Docter et al. | |
| 6,401,079 | B1 | 6/2002 | Kahn et al. | |
| 6,633,859 | B1 | 10/2003 | Farlow et al. | |
| 6,640,216 | B1 | 10/2003 | Loofbourrow et al. | |
| 6,678,714 | B1 | 1/2004 | Olapurath et al. | |
| 6,684,369 | B1 | 1/2004 | Bernardo et al. | |
| 6,975,330 | B1 | 12/2005 | Charlton et al. | |
| 2001/0037223 | A1 | 11/2001 | Beery et al. | |
| 2001/0039594 | A1* | 11/2001 | Park et al. | 709/311 |
| 2002/0022982 | A1 | 2/2002 | Cooperstone et al. | |
| 2002/0049617 | A1 | 4/2002 | Lencki et al. | |
| 2002/0069077 | A1 | 6/2002 | Brophy et al. | |
| 2002/0095571 | A1 | 7/2002 | Bradee | |
| 2002/0099659 | A1 | 7/2002 | Swentor | |
| 2002/0103680 | A1 | 8/2002 | Newman | |
| 2002/0129034 | A1 | 9/2002 | Woehl | |
| 2002/0161766 | A1 | 10/2002 | Lawson et al. | |
| 2002/0169649 | A1 | 11/2002 | Lineberry et al. | |
| 2002/0188551 | A1 | 12/2002 | Grove et al. | |
| 2003/0037263 | A1 | 2/2003 | Kamat et al. | |
| 2003/0058277 | A1 | 3/2003 | Bowman-Amuah | |
| 2003/0088443 | A1 | 5/2003 | Majikes et al. | |
| 2003/0105692 | A1 | 6/2003 | Gilbert et al. | |
| 2003/0120526 | A1* | 6/2003 | Altman et al. | 705/5 |
| 2003/0151621 | A1 | 8/2003 | McEvilly et al. | |
| 2003/0225720 | A1 | 12/2003 | Farlow et al. | |
| 2004/0002944 | A1 | 1/2004 | Hauser et al. | |
| 2004/0139092 | A1 | 7/2004 | Jones, Jr. et al. | |
| 2004/0172268 | A1 | 9/2004 | Franklin et al. | |
| 2004/0216084 | A1 | 10/2004 | Brown et al. | |

OTHER PUBLICATIONS

"Secure Identity Management," Waveset Technologies, Inc., (2 pages). http://www.waveset.com/Solutions/Lighthouse/index.html , Date Unknown—at least as early as Aug. 3, 2003.

"Products and Services Enterprise Solutions," PeopleSoft (5 pages). Date Unknown—at least as early as Dec. 11, 2003, http://web.archive.org/web/19980630020850/http://www.peoplesoft.com/products__and__services/ent . . . .

"PeopleSoft Portal Solutions," PeopleSoft 2001 (20 pages). 2001.

"Vignette© (4 pages). http://www.vignette.com/contentmanagement/0,2097, 1-1-1928-4149-19, Vignette V7 Content Services," Date Unknown—at least as early as Aug. 16, 2004.

"Vignette© Content Management," Vignette (2 pages). http://www.vignette.com/contentmanagement/0,2097,1-1-1928-4149-19, Date Uknown—at least as early as Aug. 16, 2004.

"Important Considerations when Selecting a Content Management Solution," Vignette. Jul. 2003. (20 pages).

Office Action dated Apr. 15, 2009 for related U.S. Appl. No. 11/107,415.

Office Action dated Aug. 4, 2008 for related U.S. Appl. No. 11/107,415.

Office Action dated Feb. 20, 2008 for related U.S. Appl. No. 11/107,415.

Office Action dated Oct. 8, 2008 for related U.S. Appl. No. 11/107,417.

"Administering Enterprise User Security," Oracle9 *i* Security Overview (4 pages). http://www.csis.gvsu.edu/GeneralInfo/Oracle/network.920/a96582/entusers.htm.

Shahnam, Liz, "Teradata CRM," (pp. 1-4).

"Secure Identity Management," Waveset Technologies, Inc., (2 pages). http://www.waveset.com/Solutions/Lighthouse/index.html.

"Genesys Delivers Easy-to-Implement Web-Enabling Toolset," Genesys Software Systems, Inc. 1997 (2 pages) http://web.archive.org/web/1998061505467/www.genesys-soft.com/websrvpr.html.

"Genesys Adds Innovative, Internet-Based Self-Service Capabilities to HRMS Outsourcing Solutions," Genesys Software Systems, Inc 1998 (2 pages). http://web.archive.org/web/19980615054613/www.genesys-soft.com/wbsvgos.html.

"Genesys Human Resource System," , Genesys Software Systems, Inc. 1998 (1 page). http://web.archive.org/web/19980615054309/www.genesys-soft.com/hr.html.

"Genesys Software Products," Genesys Software Systems, Inc. 1998 (2 pages). http://web.archive.org/web/19980615054137/www.genesys-soft.com/products.html.

"1997 Enhancement Highlights," Genesys Insight: A Solutions Newsletter, Genesys Software Systems, Inc. 1997 (6 pages). http://web.archive.org/web/19980615054715/http://www.genesys-soft.com/newsltr.html.

"Genesys Outsourcing Services," Genesys Software Systems, Inc. 1998 (2 pages). http://web.archive.org/web/19980615054303/www.genesys-soft.com/gos.html.

"Products and Services Enterprise Solutions," PeopleSoft (5 pages). http://web.archive.org/web/19980630020850/http://www.peoplesoft.com/products__and__services/ent . . . .

"PeopleSoft Portal Solutions," PeopleSoft 2001 (20 pages).

"Vignette© V7 Content Services," Vignette (4 pages). http://www.vignette.com/contentmanagement/0,2097, 1-1-1928-4149-19 . . . .

"Vignette© Content Management," Vignette (2 pages). http://www.vignette.com/contentmanagement/0,2097, 1-1-1928-4149-19 . . . .

"Important Considerations when Selecting a Content Management Solution," Vignette 2002 (20 pages).

Rossello, et al., "Learning Experience: Houghton Mifflin Takes Textbook Business Online," Seybold Publications, V-2, No. 11, Jul. 1998 (4 pages). www.seyboldreport.com.

"Template Developer Tool Guide," Storyserver V 4.0, Jul. 1998 (72 pages).

Office Action dated Sep. 16, 2009 for U.S. Appl. No. 11/107,416. (23 pages).

Office Action dated Jun. 29, 2009 for U.S. Appl. No. 11/107,417. (10 pages).

Office Action dated Oct. 8, 2008 for U.S. Appl. No. 11/107,417. (10 pages).

Skyhawk (retrieved from the Internet Archive at http://web.archive.org/web/20040105544619/http://www.skyhawksystems.com/users__guide/mapRule.htm), 5 pages (2004).

Office Action dated Dec. 31, 2009 for U.S. Appl. No. 11/107,415. (23 pages).

* cited by examiner

1300

1400

2900

Transaction types and rules

The following full payout trans[...]

| Transaction name |
|---|
| FULL PAYOUT - PREAPPROVE[D] |

- Hardship withdrawals
- Partial withdrawals

How to apply

You may be able to apply for a[...]

- accessing NetBenefits
- accessing the Voice R[...]
- contacting a Fidelity P[...]
- contacting The Benefit[...]

Approval ⊕ ← 2803

Your employer has directed Fi[delity...]
transactions.

Spousal consent

The full payout transaction req[...]
Marital status

---

2903a

PAGE:
401(k) Payout
SECTION:
Approval
SELECTED TEXT:
Your employer has directed Fidelity to process your paperless (preapproved) full payout *transactions*.
COMMENTS:
Typo- the term "transactions" should be singular. Change to transaction.
STATUS:
CSM approval not needed for this typo. Content element currently checked out to G123PH6, Jane Doe for modification.

2903b

PAGE:
401(k) Payout
SECTION:
Approval
SELECTED TEXT:
None, there is an addition to the existing text
COMMENTS:
Change-client will now also allow Fidelity to process (preapproved) partial payouts.
STATUS:
CSM approval has been granted. In authoring queue.

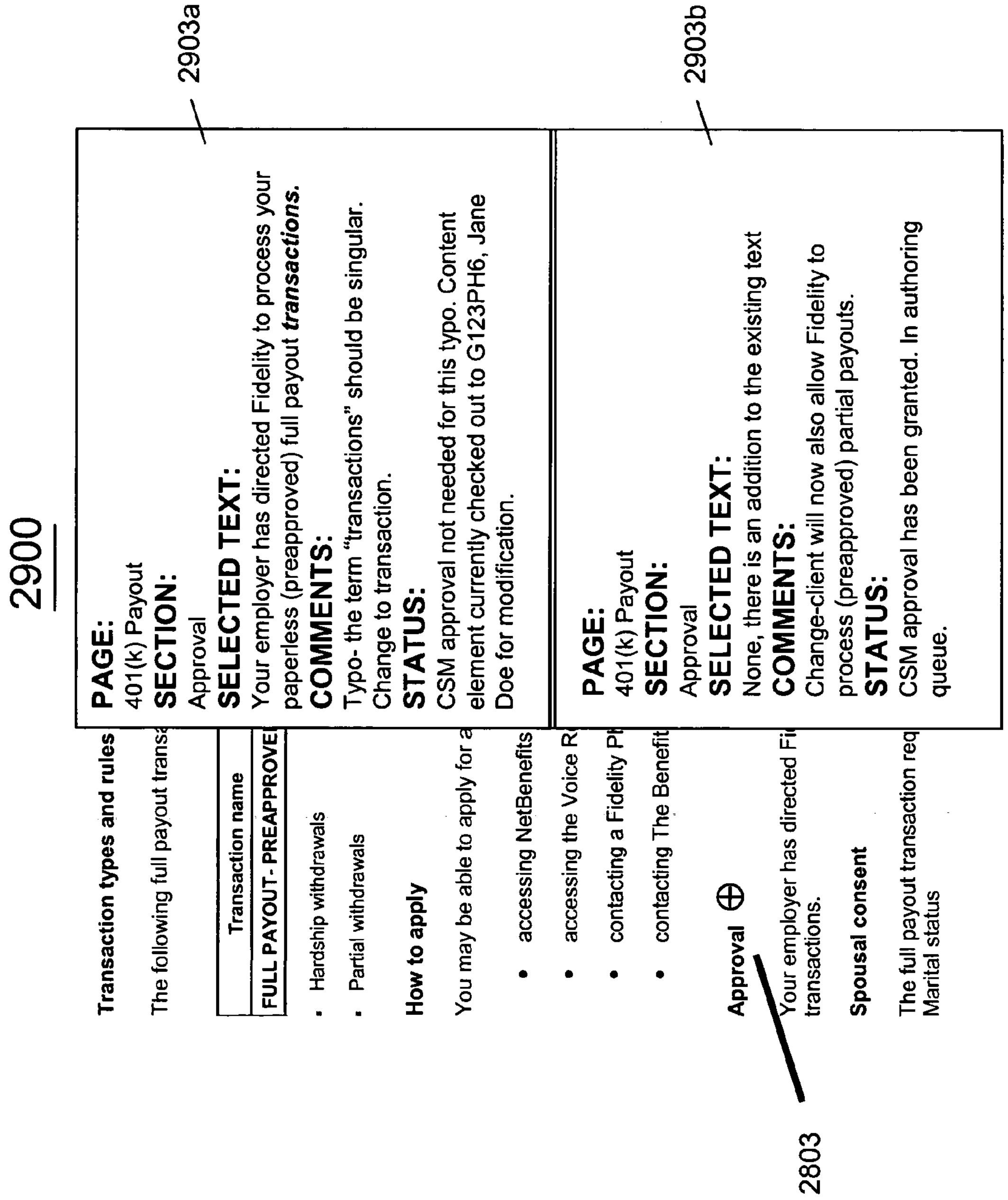

FIG. 29

QUALITY CONTROL OF AUTHORING WORK FLOW WITHIN A BENEFITS CONTENT SYSTEM

FIELD OF THE INVENTION

The present invention relates to quality control of authoring work flow within a benefits content management the system.

BACKGROUND

Managing the human resources (HR) and benefits functions of an organization (e.g., a corporation) can be a daunting task. Different benefits plans and policies that the organization offers are stored in different places. Some may be stored electronically and others mechanically. Different departments can be responsible for different benefits, so that an employee has to make several inquiries to different people to obtain answers. To assist an organization, vendors have developed automated software products to centralize and automate the management of the organization's benefits programs. For example, systems are described in U.S. Pat. Nos. 5,590,037, 5,600,554, 6,505,183, 6,640,216, and 6,633,859 and U.S. Patent Published Application Nos. 2002/0022982, 2002/0049617, 2002/0069077, 2002/0099659, 2002/0103680, and 2003/0101091.

For many organizations, an investment in new and unknown technology is unappealing. These organizations want to focus on what they do best and outsource human resources management to service providers specializing in that area. One survey result indicated that 72 percent of large companies surveyed outsourced at least one HR/benefits function. Human resource outsourcing (HRO) providers span the spectrum of the scope of services they provide. Some provide information technology (IT) services for the HR function, such as IT strategy, data centers, development of in-house applications, voice and data networks, and help desks. Others provide call centers for employees. Others provide transactional services, such as training and development, benefits record keeping, accounts receivable, tax services, compensation and payroll, and storeroom/warehouse administration. Others provide all of these services plus other top-level and strategic planning, such as information management, budget forecasting, risk management, and material resource planning (MRP). These service providers provide full service benefits programs outsourcing (BPO). According to another survey, in 2003, the growth in the global full service HRO market was 24%, with annualized revenues of 1.6 billion dollars (US). The amount of employees serviced by full service HRO providers was 2.6 million employees. The average total contract value for transactions for the reported HRO contracts was 215 million dollars.

There are several service providers specializing in providing the management of benefits programs and who are providing full service to these organizations. One example is Fidelity Investments of Boston, Mass. In being a full-service benefits outsourcer, Fidelity Investments provides a Web-based user interface called netBenefits$^{SM}$ to assist an employer with delivery of the employer's benefits programs to its employees. The netBenefits$^{SM}$ user interface allows a plan participant (e.g., employee) to access one or more benefits programs (e.g., a 401(k) plan) and obtain self-help to answer questions about the benefits programs (e.g., balance of a 401(k) plan, loan availability, and loan requirements, etc.) and self-service to perform certain transactions associated with the benefits programs (e.g., transfer funds, loan initiation, etc.).

SUMMARY OF THE INVENTION

The description describes methods and apparatus, including computer program products, for a benefits content management system. In general, in one aspect there is a computerized method for quality control of authoring work flow within a benefits content system. The method includes generating a first change request in a work flow process to implement a first change to a portion of content within the benefits content system and associating a first status indicator, indicating whether the first change has passed a quality check, with the first change request. The method also includes associating a second status indicator, indicating whether the first status indicator should be overridden, with the first change request, and moving the first change request to the next step in the work flow process if the associated first status indicator indicates the first change has passed the quality check. The method also includes preventing the first change request from moving to the next step in the work flow process if the associated first status indicator indicates the first change has failed the quality check and the associated second status indicator indicates that the first status indicator should not be overridden. The method also includes moving the first change request to the next step in the work flow process if the associated first status indicator indicates the first change has failed the quality check and the associated second status indicator indicates that the first status indicator should be overridden.

Other examples can include one or more of the following features. The next step in the work flow process can include production. Some examples prevent the first change request from being closed while the associated first status indicator indicates the first change has failed the quality check. Some examples prevent the second status indicator to indicate an override of the first status indicator if the associated first status indicator does not indicate the first change has failed a non-critical quality check. Some examples verify the first change to complete the quality check. Some examples associate a second change request in the work flow process to implement a second change to the portion of content with the first change request, and the second change request includes an associated first status indicator indicating that the second change request has passed the quality check. Some examples move the second change request to a next step in the work flow process if the first status indicator associated with the first change request indicates the first change has passed the quality check. Some examples prevent the second change request from moving to the next step in the work flow process if the first status indicator associated with the first change request indicates the first change has failed the quality check and a second status indicator associated with the first change request indicates that the first status indicator should not be overridden, and move the second change request to the next step in the work flow process if the first status indicator associated with the first change request indicates the first change has failed the quality check and the second status indicator associated with the first change request indicates that the first status indicator should be overridden. Some examples verify the second change through quality assurance to complete the quality check.

The first change request and the second change request can be associated by comprising content of a common subject. The second change request can be prevented from moving to production if the first status indicator of the first change request indicates failure and the second status indicator of the first change is not set to override. Some examples automatically transmit an electronic message to an author associated with the first change request in response to the change request having a change in status. The electronic message can be an email. The change in status can include the associated first status indicator being set to indicate that the first change has failed the quality check. Some examples generate a local database associated with an author associated with the first change request, where the local database includes the first change to the portion of content. Some examples associate a location indicator, indicating a location of the first change, with the first change request. The location can include a location of the local database. The location can include a location of a local database associated with a user, wherein the user is co-worker of the author assisting the author with the first change.

In another aspect, there is a computer program product, tangibly embodied in an information carrier, for quality control of authoring work flow within a benefits content system. The computer program product includes instructions being operable to cause data processing apparatus to perform any of the processes described above. In another aspect, there is a system for quality control of authoring work flow within a benefits content system. The system comprises a computing device configured to perform any of the processes described above.

Implementations can realize one or more of the following advantages. As outsourcing continues to grow and more organizations request services from a human resources benefits outsourcer, the benefits content management system is scalable and can easily handle the increase in volume of both viewing content and changing content. The system provides processes to allow multiple-user authoring, allow authors to make decisions about controlling access to related content, control viewing at many different granularities, control the quality of changes to the content while also allowing the change process to progress when certain faults can be tolerated, and indicate pending changes to content being viewed. The system combines many available and existing the systems together to provide the features described herein, and some of those features are a result of having to join different the systems together.

The system can coordinate changes across multiple authors to maintain content consistency, eliminate record locking issues, and prevent authors from overwriting each other's work. The system can control access to changes based on a variety of parameters, keeping changes to content close to the users who own the content. The authoring tools security (e.g., access control) settings carry over into the runtime environment, where users of different experience levels can have different access rights. The system ties the transfer process to a workflow process so that efficiencies can be realized through a systematic schedule of object transfers. The system also links a pending change indication process to the workflow process so that the system can automatically generate a pending change indicator on viewed content when a change request is pending and automatically remove that indicator when a change request is closed. The system also links a quality control process to the workflow process so that automatic notifications can be sent to the applicable users when a change request changes status, eliminating the need for a user to query the system regarding the current status. The quality control process also enables users to decouple failed content, so that other related content changes are not held up, and to allow content with minor problems to move to production without losing an indication that a problem still needs to be addressed.

The system can control the granularity of the content viewed based on the role of the user viewing the content, automatically providing more or less content as the situation requires. Out of the hundreds of benefits programs an outsourcer might manage, the system enables the outsourcer to associate individual employees with specific benefits programs. This also allows multiple plans from the same plan type to be designated as actively enrolled in or available to a single participant. The system also enables sharing of benefits program content across multiple programs to realize efficiencies of scale. One implementation of the invention may provide all of the above advantages.

The details of one or more examples are set forth in the accompanying drawings and the description below. Further features, aspects, and advantages of the invention will become apparent from the description, the drawings, and the claims.

BRIEF DESCRIPTION OF THE DRAWINGS

FIG. 29 is a screen shot showing a generated display with a description of a pending content change.

DETAILED DESCRIPTION

1. Overview

This detailed description includes headings to several sections. This first section presents an overview that highlights components included in a benefits content management system. The overview also provides some exemplary roles of different users of the system. The second section of the description describes processes for viewing content in the benefits content management system. These processes highlight the filtering of content based on a user identity and/or role. The third section of the description describes processes for changing content in the benefits content management system. These processes highlight the allowance of multiple authors changing the content, the indication of pending changes to users of the content, and the quality control used to process changes.

A Benefits Content Management System

Figure 1:
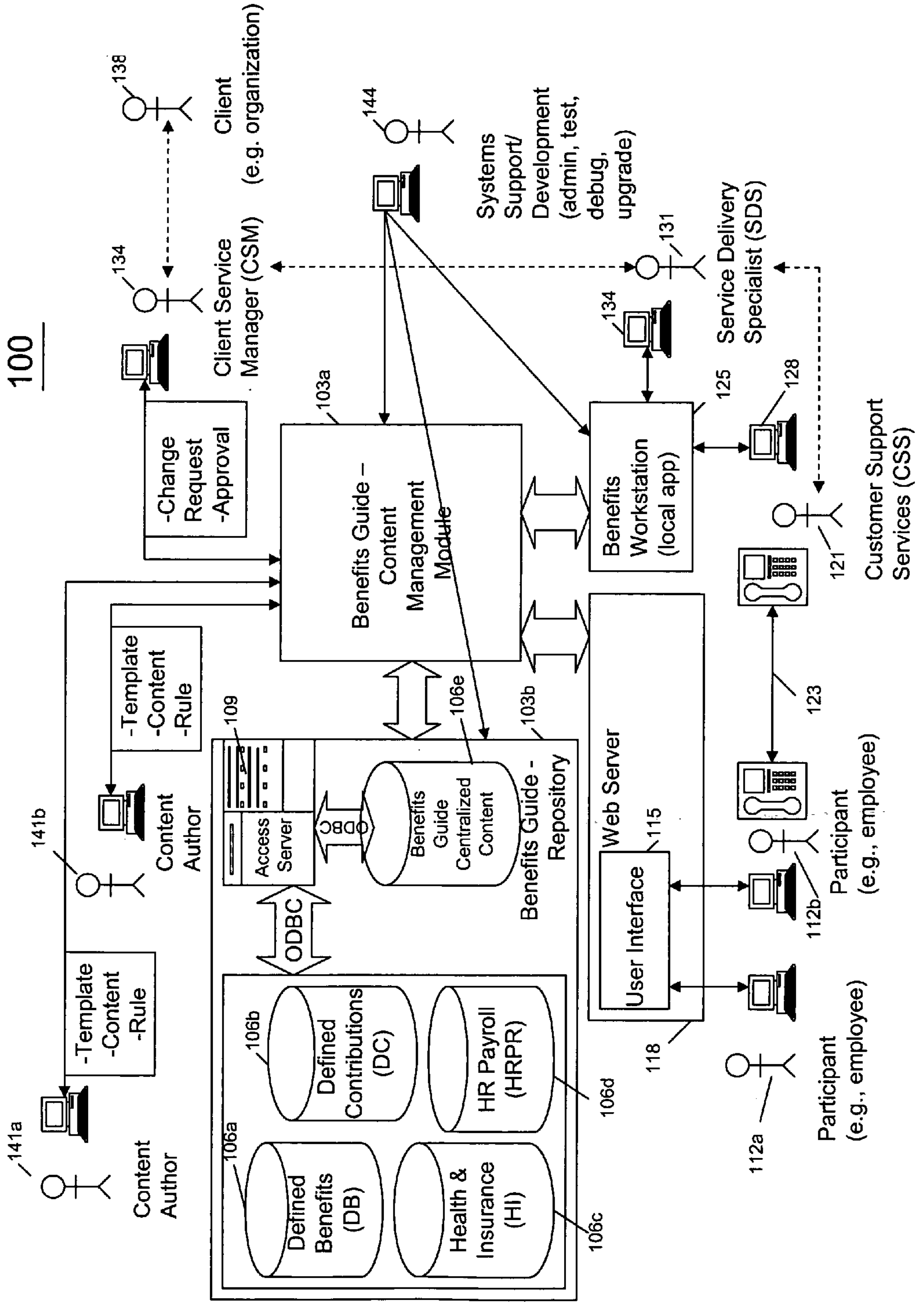
FIG. 1 is a block diagram showing a benefits content management system.

FIG. 1 illustrates an exemplary benefits content management system 100. The system 100 includes a content management module 103*a* that manages content of one or more benefits programs. The system 100 also includes a repository module 103*b* that stores the information used to generate the content. The content management module 103*a* and the repository 103*b* are referred to together as a benefits guide (BG) 103.

A benefits program refers to a plan (e.g., health/dental/life/disability insurance benefit plan, 401(k) retirement plan), a policy (e.g., policy manual on sexual harassment in the workplace), an event (e.g., having a baby or getting married), etc. The content of a benefits program refers to all of the information used to describe that benefits program. For example, a health insurance benefit plan may apply to a child of an employee that is over 18 as long as the child is registered as a full-time student. The information describing whether such coverage is allowed and the requirements of such coverage constitutes a portion of the content of this health benefit program. The particular sentence or paragraph describing this particular benefit (i.e., coverage of a child over 18) can be referred to as a content element, as this sentence or paragraph description is a portion of all of the content that makes up the complete description of the health insurance benefit. The content element can include both a template, shared across benefits programs and variables that may also be shared across benefits programs or be specific to a single benefit program. The variables can be used to generate content dynamically, and such variables also can be considered part of the content.

Generally, the benefits guide 103 manages all of the content for a service provider that provides the service of managing content of benefits programs for one or more organizations. The service provider enables employees of an organization to access content related to benefits programs the organization offers, providing access to answers about the benefits programs. The service provider also maintains the accuracy of the data, changing the content when necessary, and maintains the technology (e.g., the system 100) required to provide these services. The content management module 103*a* manages the interface between users of the benefits guide and the repository 103*b* in which the content is stored. The repository 103*b* serves as the centralized storage for all of the content and is used to store and access the content of the benefits programs.

Connected to the exemplary repository 103*b* shown in FIG. 1 there are five databases 106*a*, 106*b*, 106*c*, 106*d*, and 106*e* generally referred to as benefits content databases 106. The database 106*a* is a defined benefits (DB) database, which stores content of benefits programs related to defined benefits plans (e.g., pension plans). The database 106*b* is a defined contributions (DC) database, which stores content of benefits programs related to defined contributions plans (e.g., 401(k) plans). The database 106*c* is a health and insurance (HI) database, which stores content of benefits programs related to health and insurance, such as health insurance programs, dental insurance programs, disability insurance programs, etc. The database 106*d* is a human resources (HR) and payroll (HRPR) database, which stores content of benefits programs related to the payroll and human resources policies of an organization. The database 106*e* is a centralized database, which stores content of one or more benefits programs (e.g., defined contributions, defined benefits, heath and insurance, human resource, payroll, etc.). In the system 100, the content management module 103*a* accesses the databases 106 using an access server 109. The exemplary server 109 uses a request protocol (e.g., a structured query language (SQL)) that communicates with the databases 106 using an open standard application programming interface (API) (e.g., open database connectivity (ODBC)) for allowing access to dissimilar proprietary databases. Other examples of the repository 103*b* can use other database management technologies, such as Java database connectivity (JDBC). Other examples of the request protocol by the exemplary server 109 may include Web services (e.g. HTTP SOAP requests).

FIG. 1 also illustrates exemplary roles of different users of the system 100. The roles of users 112*a* and 112*b* are as participants, generally referred to as the participants 112. The participants 112 are generally employees of an organization and are viewers of the content of one or more benefits programs stored in the repository 103*b*. The participants 112 view the content to answer questions about specific benefits programs they are receiving from an organization (e.g., their employer) and/or to see the requirements/restrictions to perform a certain transaction (e.g., move funds in a 401(k) plan) and/or to see the benefits programs they are eligible to enroll in from an organization. When performing a self-service transaction, the participants 112 can indirectly access the content management module 103*a* using an application 115 through a Web server 118. Having an Internet-based user interface application 115, the participants 112 can use a computing device with an Internet browser to interact with application 115. For example, the application 115 can be the Fidelity netBenefits$^{SM}$ user interface provided by Fidelity Investments of Boston, Mass.

The role of user 121 is customer support services (CSS). The CSS user 121 is, for example, a telephone representative that talks to a participant 112*b* over a telephone network 123 (e.g., public switched telephone network (PSTN)). The CSS user 121 is generally an employee of the service provider and a viewer of the content of one or more benefits programs stored in the repository 103*b*. The CSS user 121 views the content to answer questions of a participant 112*b*. There can be multiple levels of CSS users, for example a junior CSS user and a senior CSS user. These levels can limit how the CSS user interacts with other users and with the system 100. The CSS user 121 can access the content management module 103*a* using a front-end application 125 that executes locally on a computer 128 associated with the CSS user 121. For example, the local application 125 can be referred to as a benefits workstation. The benefits workstation application 125 provides a user interface to enable the CSS user 121 to enter data about the participant (e.g., social security number) and to display the content returned from the content management module 103*a* based on the entered information. The benefits workstation application 125 may also automatically receive participant context information (e.g., social security number) from a voice response system (VRS) (not shown) and pass that information to the content management module 103*a* to display appropriate content. In one example, the benefits workstation application 125 is a portal application and communicates with the content management module 103*a* using application communication technologies (e.g., a client/server paradigm or a Web-based client paradigm). If the CSS user 121 notices an error in content (e.g., a typographical error) while answering a question for a participant, the CSS user 121 can notify another user to make a change. For example, the CSS user 121 can notify a service delivery specialist (SDS) user 131.

The SDS user 131 is generally an employee of the service provider and a viewer of the content of one or more benefits programs stored in the repository 103*b*. The SDS user 131 views the content to verify the errors found by the CSS user 121. The SDS user 131 can access the content management module 103*a* using the benefits workstation application 125 that executes locally on a computer 134 associated with the SDS user 131. In some examples, the SDS user 131 can initiate a request to change a portion of the content. The system 100 includes or communicates with a workflow process (e.g., 218, FIG. 2) to track a request for a change to a portion of content. The SDS user 131 serves as a liaison between the CSS user 121 and a client service manager (CSM) user 134. In such a situation, the SDS user 131 communicates with the CSS user 121 and the CSM user 134 until a change request is resolved (e.g., change is incorporated into content or change request is closed as not being needed).

The CSM user 134 is generally an employee of the service provider and a viewer of the content of one or more benefits programs stored in the repository 103*b*. The CSM user 134 may view the content by accessing through the benefits workstation application 125 or by accessing the content management module 103*a* directly, in which case the module 103*a* applies security restrictions to limit access to particular benefits programs or subsets of content elements. The CSM user 134 views the content to verify that the content is accurate according to a client 138. The client 138 is a representative of an organization (e.g., an employer) to which the service provider provides the content management services. The CSM user 134 can initiate a request to change a portion of the content and view and/or change the status of pending change requests in the workflow process. Because the CSM user 134 has a direct relationship with the client 138, the CSM user 134 typically is involved in the approval process of a change request for content associated with that user 138.

The roles of users 141*a* and 141*b* are as content authors, generally referred to as the authors 141. The authors 141 are generally employees of the service provider. The authors 141 have direct access to the content management module 103*a* so that they can generate and maintain the content of the benefits programs stored in the repository 103*b*. The authors 141 also generate and maintain templates that can include both static content and logic to generate dynamic content. The authors 141 also generate and maintain logic to incorporate business rules that can trigger specific content based on client, participant, or benefits program data (e.g., variables).

The role of user 144 is a systems support and development (SSD) user. The SSD user 144 is generally an employee of the service provider. The SSD user 144 maintains the technology of the system 100. In other words, the SSD user 144 configures, tests, debugs, and upgrades the hardware and software components of the system 100. The SSD user 144 can also generate applications needed to integrate the different components, some of which can be off-the-shelf components of the system 100. The SSD user 144 may also perform administrative functions on the system (e.g. setting security access).

Figure 2:
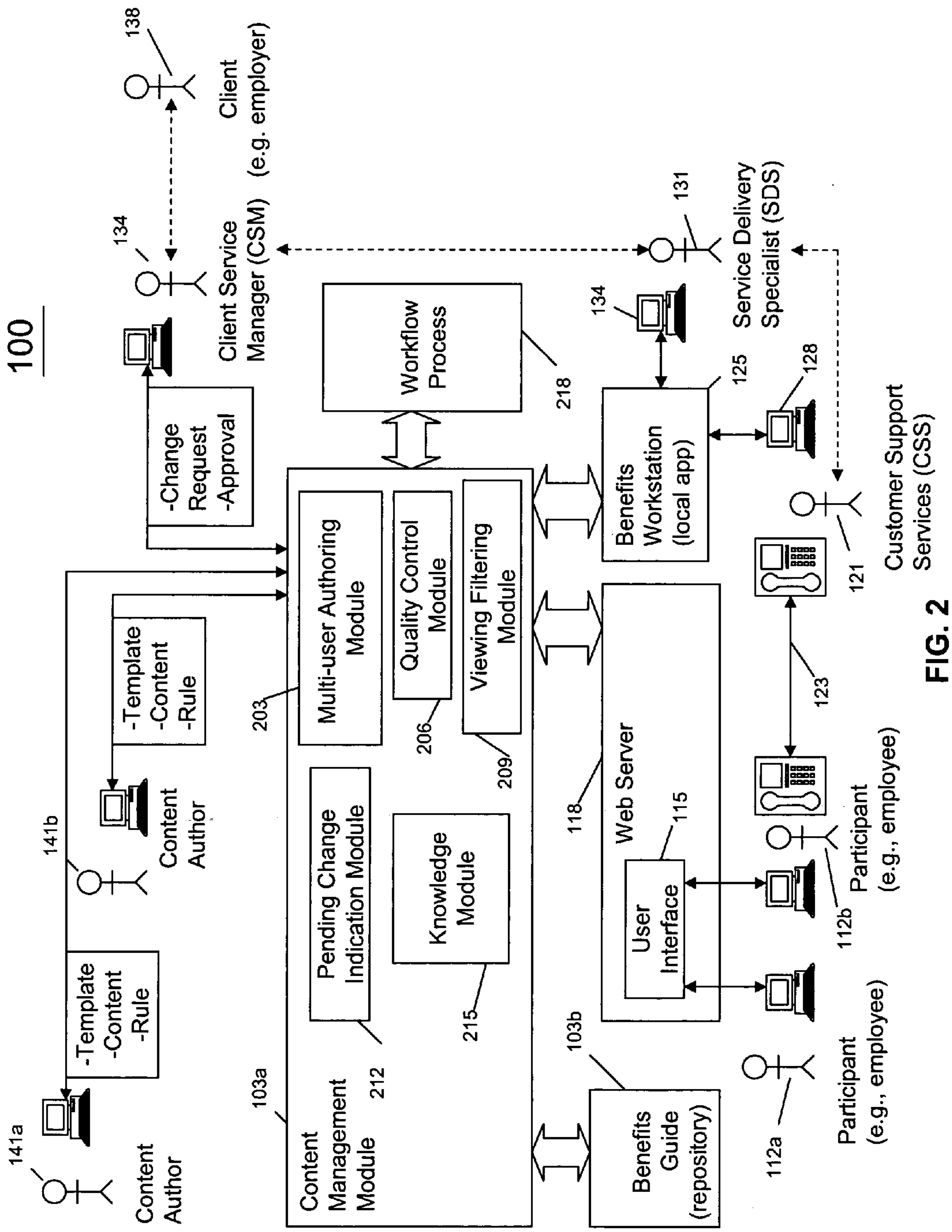
FIG. 2 is a block diagram showing a content management module of the system.

FIG. 2 illustrates a logical view of the components of the content management module 103*a*. The content management module 103*a* includes a multi-user authoring module 203, a quality control module 206, a viewing filtering module 209, and a pending change indicator module 212. The modules 203, 206, 209, and 212 enable the system 100 to provide different features to the different users of the system 100. In general, the multi-user authoring module 203 provides features to manage the access to related content by different authors. The quality control module 206 provides features to expedite the processing and production of changed content without losing control of quality procedures. The viewing filtering module 209 provides features to filter the content based on the role of the user accessing the content. The pending change indicator module 212 provides features to indicate automatically a pending change associated with a portion of content.

The modules 203, 206, 209, and 212 interact with a knowledge base module 215 and a workflow process 218. The knowledge module 215 models the content and enables the use of templates to generate content dynamically using organizational variables. The knowledge module 215 can be implemented, using for example, one or more of the Authoria Advisor Series products, such as Employee Advisor and/or Manager Advisor, manufactured by Authoria, Inc. of Waltham, Mass. or one or more of the Vignette suite of products, manufactured by Vignette Corporation of Austin, Tex. The workflow process 218 tracks changes to the content. The system 100 shows the use of a workflow process that is external to the content management module 103*a* and can be used for other enterprise workflows, in addition to tracking the changes to content. The logical view is intended to show the functionality of the content management module 103*a* and the physical boundaries of the implementation can be different from the logical boundaries shown in the exemplary the system 100. In some examples, a single server and/or a single application implement all of the modules 203, 206, 209, and 212. In other examples, two or more servers and/or applications implement the modules 203, 206, 209, and 212, without regard to the logical boundaries shown in FIG. 2. In yet other examples, the knowledge module 215 can be external to the content management module 103*a* and/or the workflow process 218 can be included in the content management module. For example, Vingette® of Austin Tex. offers a platform, referred to as Vignette® V7, that includes a suite of content management products. The Vignette® V7 products are marketed as a Web content manager, but the platform is adaptable to be incorporated as part of the implementation of the system 100. For example, the Vignette® V7 products from Vingette® of Austin Tex. include a workflow process 218 and a content modeler 215 that can be integrated into a single content management solution. The Vignette® V7 platform also includes a rich set of APIs that enable the modules 203, 206, 209, and 212 to provide their associated features on top of this platform. Further examples can include any other products that perform in the enterprise content management space, notably Documentum and IBM, which can be adapted as described herein.

Figure 3:
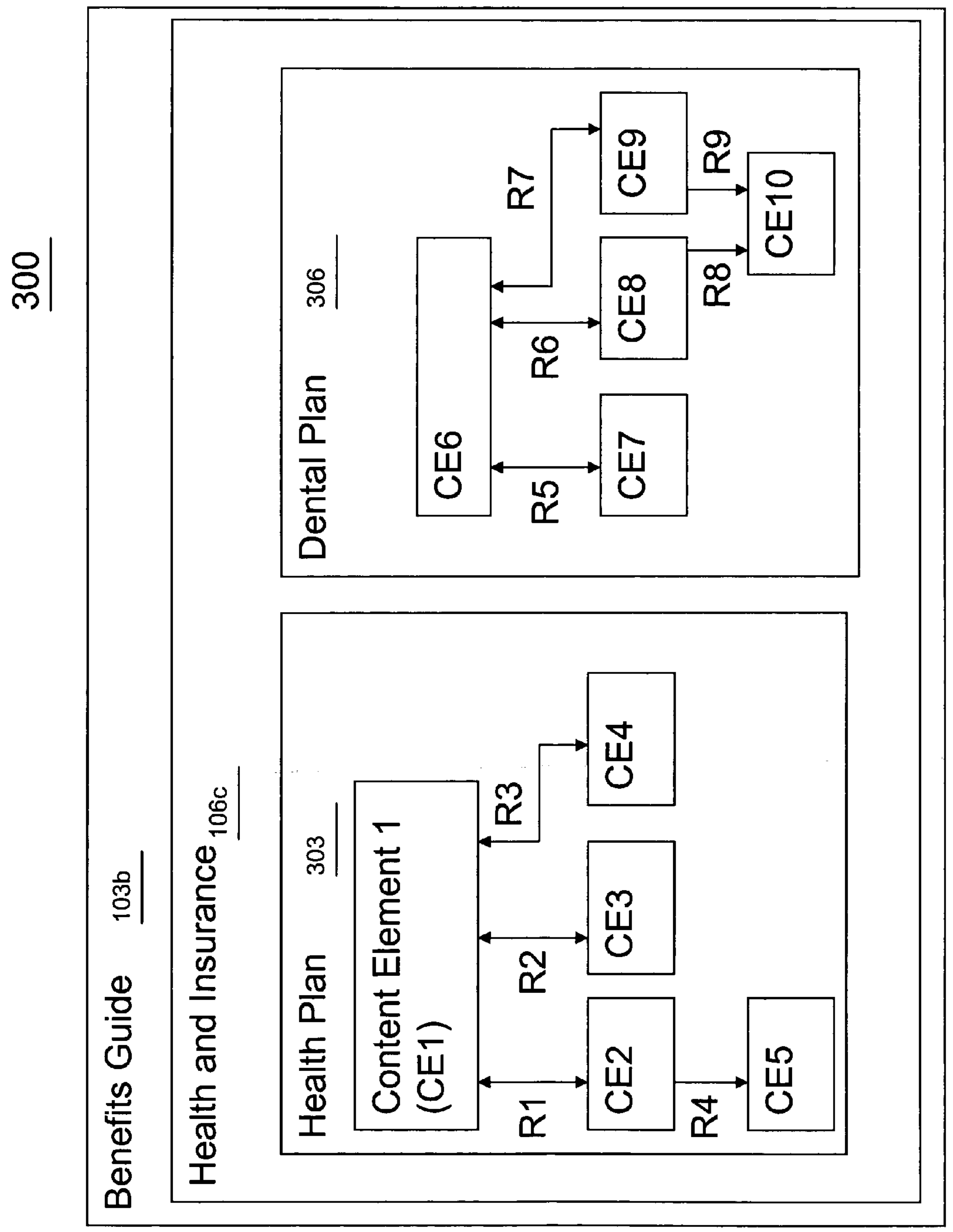
FIG. 3 is a block diagram showing relationships between content elements.

Irrespective of the content management tools used to implement the system 100 (e.g., a combination of products from vendors and custom written software modules written by in-house developers), the content of the system 100 is modeled in a fashion to implement the processes described herein. FIG. 3 illustrates an exemplary logical diagram 300 modeling the content included in the system 100. The diagram 300 shows that the health and insurance database 106*c* within the benefits guide repository 103*b* includes two benefits programs, a health plan 303 and a dental plan 306. The content of the health plan 303 and the dental plan 306 is modeled by a collection of content elements having certain relationships with other content elements. In the health plan 303, a content element CE1 has a relationship R1 with a content element CE2, a relationship R2 with a content element CE3, and a relationship R3 with a content element CE4. The content element CE2 has a relationship R4 with a content element CE5. Similarly, in the dental plan 306, a content element CE6 has a relationship R5 with a content element CE7, a relationship R6 with a content element CE8, and a relationship R7 with a content element CE9. The content elements CE8 and CE9 have relationships R8 and R9, respectively, with a content element CE10.

A content element is a portion of the content and can be, for example, a sentence, a paragraph, a section of multiple paragraphs, a variable, or some combination of these. The system 100 can generate a content element using a template. The following examples describe content elements describing the eligibility of dependents and are used in conjunction with FIG. 3 to help illustrate an example of content elements and their relationships. The content element CE1 represents the following template:

| Eligibility of a Dependent |
| --- |
| If your dependent is under the age of 18, your dependent is eligible under your health_plan_name health insurance.<br>IF dependent_eligibility_over_18=TRUE,<br>THEN INCLUDE CE2 |

This exemplary template includes the variable health_plan_name, the value for which is inserted when the system 100 generates this content element for viewing. The value for the variable health_plan_name varies by plan. The value for the variable health_plan_name, and any other variables may be retrieved from the centralized content 106*e* or from one of the record keeping system stores 106*a*, 106*b*, 106*c*, or 106*d*. Variable values stored in the record keeping system stores may also be used for record keeping and benefits program transactions. For the health plan 303, the value of the variable health_plan_name is Blue Cross PPO. The exemplary template above is content element CE1, so the variable health_plan_name is content element CE3 and the association between the template and the variable for this plan is the relationship R2. The relationship R2 can be implemented using, for example, a database table. In this example, there can be one or more rows in a table for the health plan 303 identifying that the content element CE1 is the template above and the associated value for the variable health_plan_name is Blue Cross PPO. When a variable is used, the content element of the variable (e.g., CE3) can also have a relationship (not shown) to a question content element that facilitates content entry by content authors 141. A question content element is a piece of content that describes what the variable represents, typically in the form of a question. For the CE3 example, the question content element can be a string of text as follows: WHAT IS THE NAME OF THE HEALTH PLAN? The system 100 uses these questions when obtaining values for these variables from a user of the system 100 who enters them, such as the content author 141*a* or the CSM user 134.

The CE1 exemplary template above also includes the variable dependent_eligibility_over 18, the value for which is used by the system 100 to determine whether the IF condition is met. The value for the variable dependent_eligibility_over__18 varies by plan. For the health plan 303, the value of the variable dependent_eligibility_over__18 is TRUE. The exemplary template above is content element CE1, so the variable dependent_eligibility_over__18 is content element CE4 and the association between the template and the variable for this plan is the relationship R3. The relationship R3 can be implemented using, for example, the same database table as R2. Similar to above, the content element of the variable CE4 can also have a relationship (not shown) to a question content element as follows: DOES THIS HEALTH PLAN ALLOW DEPENDENT COVERAGE FOR A DEPENDENT OVER THE AGE OF 18?

If the conditional statement of the CE1 exemplary template is TRUE, then the system 100 includes the content element CE2 when generating the content for viewing. The following is an exemplary template for the content element CE2 describing the eligibility of a child over 18.

| Eligibility for a dependent over the age of 18 |
| --- |
| If your dependent is over the age of 18 and under the age of max_age_dependent_student, your dependent is eligible under your health insurance if that dependent is a full-time student. |

The CE2 exemplary template includes a variable max_age_dependent_student, the value for which is inserted when the system 100 generates this content element for viewing. The value for the variable max_age_dependent_student can vary by plan. For the health plan 303, the value of the variable max_age_dependent_student is 25. The variable max_age_dependent_student is content element CE5 and the association between the template and the variable for this plan is the relationship R4. The relationship R4 can be implemented using, for example, the same relationship database table. Table 1A illustrates an exemplary database table; Table 1B illustrates an exemplary database table that relates to Table 1A via a relationship R4.

TABLE 1A

Plan

| Field Name | Field Type | Primary/Foreign Key | Description |
| --- | --- | --- | --- |
| Plan ID | Number | <pk> | Plan key |
| Client-Practice ID | Number | <fk> | |
| Plan Name | VarChar | | Plan name |
| Plan Overview | VarChar | | Description of the plan |
| Plan Start Date | Date | | Date when the plan should first be viewable by CSS (121) |
| Plan End Date | Date | | Date beyond which the plan should not be viewable by CSS (121) |
| Plan Role | VarChar | | User roles (e.g., CSS 121) that can view this plan |

TABLE 1B

Plan Variable

| Field Name | Field Type | Primary/Foreign Key | Description |
| --- | --- | --- | --- |
| Variable ID | Number | <pk> | Variable key |
| Plan ID | Number | <fk> | Relationship R4 |
| Variable Name | VarChar | | Variable Name |
| Variable Value | VarChar | | Variable Value |
| Start Date | Date | | Date when the value of this variable is first effective for the plan. |
| End Date | Date | | Date beyond which the variable value is no longer effective for the plan |

2. Viewing Content

The system 100 uses these stored relationships when dynamically generating content for viewing. A benefit of the dynamic generation using variables is that templates can be reused across benefits programs by simply changing the variable values for each program. With so many different benefits programs, the system 100 includes processes to limit the benefits programs that a particular participant can view. One of the features provided by the viewing filtering module 209 is filtering benefits programs available to a particular user on an individual basis.

which they are associated. Table 2 lists an example of associations between benefits programs in different databases of repository 103*b* and their identifiers. As shown in Table 2, the same plan (e.g., ABC Corp. Medical Plan) can have more than one identifier and different variations of a plan (e.g., ABC Corp. Bonus Plan) can each have their own identifiers, thus limiting an employee to be able to view only the variation applicable to that employee.

TABLE 2

| Database | Benefit Program | Identifier |
|---|---|---|
| HI (106c) | ABC Corp. HealthFlex Medical Plan | XX8052HIMedActiveMed100 |
| HI (106c) | ABC Corp. HealthFlex Medical Plan | XX8052HIMedCobraMed100 |
| HI (106c) | ABC Corp. HMO Medical Plan | XX8052HIMedActiveMed200 |
| HI (106c) | ABC Corp. HMO Medical Plan | XX8052HIMedCobraMed200 |
| HRPR (106d) | ABC Corp. Bonus Plan - Highly Compensated Employees | XX8052HRPRBonusExemptYes |
| HRPR (106d) | ABC Corp. Bonus Plan - Hourly Employees | XX8052HRPRBonusNonExemptNo |
| HRPR (106d) | ABC Corp. Bonus Plan - Salary Employees | XX8052HRPRBonusExemptNo |

Filtering of Content by a Particular User

Figure 4:
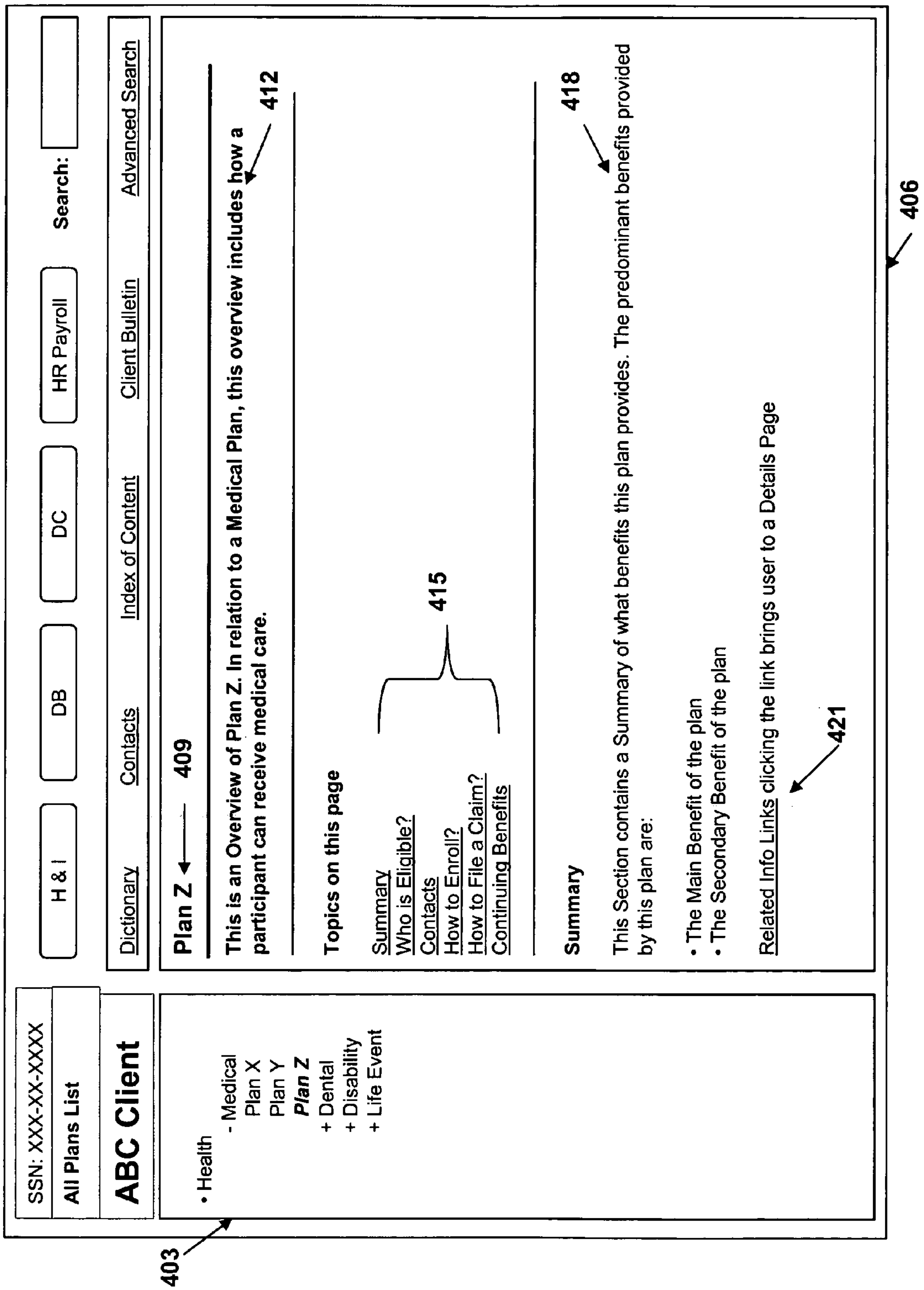
FIG. 4 is a screen shot showing a generated display to view content.

FIG. 4 illustrates an exemplary display 400 that is generated for a particular participant (e.g., participant 112*a*). The display 400 includes a first area 403 that lists the benefits programs within the system 100 in which the participant is enrolled in or for which the participant is eligible (e.g., during an open enrollment period). The first area 403 includes a highlighted benefits programs titled "Medical Plan Z". A second area 406 includes a page of content describing the highlighted benefits program. The system 100 dynamically generates the page in the area 406 using a presentation page template. A presentation page template defines the content elements, and other features such as hyperlinks, that are displayed to a user when the user requests the page.

For example, the presentation page displayed in the second area 406 includes a content element 409 at the top of the page. The content element 409 is a title indicating to the user what is displayed on the page. In this case, the page includes an overview of the highlighted health plan. The page includes a content element 412 displayed directly under content element 409. The content element 412 is a paragraph describing an overview of the type of health plan selected. Under the content element 412, there is a group of six hyperlinks 415 to move the user quickly to a specific topic within the page. Topics are stored as content elements within the repository 103*b*. The first topic of the page is summary. The page includes a content element 418 displayed under the summary heading that describes the summary for the participant. As described above, the system 100 can dynamically generate this content element 418 with a template. The page includes a hyperlink 421 to move the user quickly to the one or more content elements describing related information, such as the exemplary content element templates described above.

Figure 5:
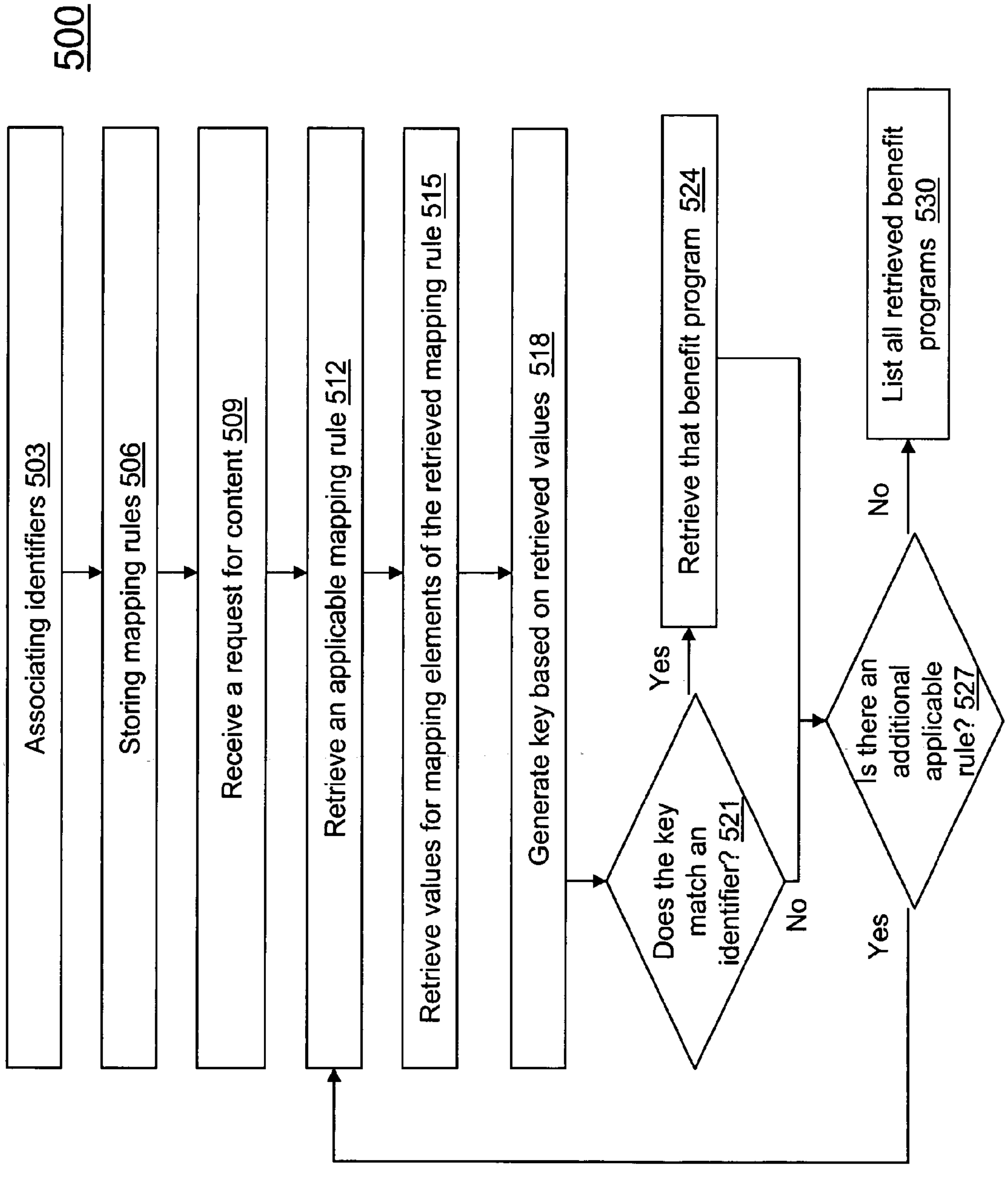
FIG. 5 is a process diagram showing filtering of content.

To determine which benefits programs are displayed in the first area 403 and available to a user to view, the system 100 (e.g., viewing filtering module 209) employs a filtering process. FIG. 5 illustrates an exemplary filtering process 500 to filter content viewed by a particular user. The system 100 associates (503) identifiers for each of the benefits programs stored in the repository 103*b* and available to a participant to view. For example, the system 100 can use a database table that lists all of the available plans and the identifiers with The system 100 also stores (506) mapping rules that instruct the system 100 on how to use retrieved data to generate an access key. For example, the system 100 can use a mapping dictionary that contains the instructions. One exemplary mapping rule in the mapping dictionary for benefits programs in the HI database 106*c* is "Client||Practice||Subject||Status||Plan Type||Plan Code" where the "||" symbol indicates appending the listed variables to generate an identifier. Another exemplary mapping rule in the mapping dictionary for benefits programs in the HRPR database 106*d* is "Client||Practice||Subject||Hourly/Salary||HighlyComp". The mapping dictionary also includes a variable mapping portion that maps the variables in the mapping rules to the variables used in the system 100. In some examples, a system implements the variable mapping as its own separate dictionary.

When the system 100 receives (509) a request to view content, the system 100 also receives a user identifier for the request. The user identifier is based on the role of the user making the request to view some content. For example, the user can be the participant 112*b*, requesting the information through the Web server 118. In such an example, the system 100 authenticates (e.g., receives correct user credentials) the participant 112*b*. One example identifier is the participant's social security number (SSN). The participant may include this identifier as part of the log-in process or the system 100 can retrieve the identifier from a participant database (not shown) based on the user credentials. The participant database can be part of the repository 103*b* or the participant database can be located external to the benefits guide 103 and accessible to the benefits guide 103 using a Web services paradigm. In another example, the user making the request is the CSS user 121 talking to the participant 112*b* over the phone network 123. In this example, the CSS user 121 makes the request using the benefits workstation application 125. Again, the request includes some identifier to identify the participant 112*b*, such as a SSN. The system 100 can determine (e.g., by receiving different parameter values in the requesting URL) whether the request is from the participant 112*b* using Web server 118 or the CSS user 121 using the benefits workstation 125 and can provide different services depending on the user role. The CSS user 121 may obtain a broader view than what the participant might be able or want to view or the CSS user 121 may select a filtered view to limit the view down to what the participant would see.

In response to the received request, the system 100 retrieves (512) the applicable mapping rule. In order to retrieve (512) the applicable mapping rule, the system may need additional information. In one example, the mapping dictionary is organized by client (e.g., employer), practice (e.g., Health & Welfare (database 106*c*)), and subject (e.g., medical). In this example, the system 100 uses the participant identifier (e.g., SSN) to determine the client with which this participant is associated. For example, the system 100 receives a SSN 999-99-9999 as an identifier for a participant who is requesting to view a list of benefits programs (e.g., the list in the first area 403 of display 400). The system 100 retrieves from the participant database that this participant is an employee of the client ABC Corp. The system 100 can use an identifier for the client other than the client's name. For example, ABC Corp. can have a client ID of XX8052. Because the request is for a list of all benefits programs, the system 100 searches for all rules associated with ABC Corp. If this was not the case, e.g., if the request was only for a medical plan, the system 100 would narrow the search even further to rules applicable to the health and insurance database 106*c*, where the subject is medical. The system 100 first finds the rule "Client||Practice||Subject||Status||Plan Type||Plan Code" for client ABC Corp. for the HI (106*c*) practice for medical plans. Using this rule, the system 100 determines that the mapping elements for which the system 100 needs to retrieve values are "Employee Status", "Plan Type", and "Plan". In other words, because this rule is applicable for client ABC Corp. for the HI (106*c*) practice for medical plans, the system 100 already has values for the mapping elements "Client", "Practice", and "Subject". The system 100 retrieves (515) values for each of these variables that correspond to the participant with a SSN of 999-99-9999. Table 3 shows exemplary values for the participant 999-99-9999.

TABLE 3

| | |
|---|---|
| SSN: | 999-99-9999 |
| Client: | ABC Corp. |
| Client id: | XX8052 |
| FT/PT: | FT |
| Hourly/Salary Indicator: | Exempt |
| Highly Compensated: | Yes |
| Division Code: | FF |
| Employee Status: | Active |
| Plan type code: | Med |
| Plan Code: | 100 |
| Effective Start Date | Jan, 1, 2002 |
| Effective End Date | 99/99/99 |
| Eligible Indicator: | Y |
| Enrolled Indicator: | Y |

The system 100 generates (518) an access key using the mapping rule and the retrieved values. Using Table 3, the system 100 inserts the value "XX8052" for the mapping element "Client", the value "HI" for the mapping element "Practice", the value "Med" for the mapping element "Subject", since the rule is applicable for medical plans, the value "Active" for the mapping element "Status", the value "Med" for the mapping element "Plan Type", and the value "100" for the mapping element "Plan Code". The system 100 appends these values to generate (518) the access key is XX8052HIMedActiveMed100. The system 100 uses the generated access key to determine (521) whether there are any program identifiers that match the access key. Using Table 2 for example, the system 100 determines that there is a match to the ABC Corp. HealthFlex Medical Plan. The system 100 retrieves (524) that matched benefits program from the respective database (e.g., 106*c*), or at least retrieves its title and other location information, so that the title can be used as a hyperlink in a displayed list (e.g., the first area 403 of the display 400).

The system 100 determines (527) whether there are any additional applicable mapping rules. For example, if the request is to generate a page with an area similar to first area 403 of the display 400, then the system 100 searches for all of the benefits programs in repository 103*b* associated with the client ABC Corp. In addition to the medical plan, the system 100 finds the rule "Client||Practice||Subject||Hourly/Salary||HighlyComp" in the mapping dictionary for client ABC Corp. for the HRPR (106*d*) practice for bonus plans and retrieves (512) this rule. Using this rule, the system 100 determines that the mapping elements for which the system 100 needs to retrieve values are "Hourly/Salary" and "HighlyComp". The system 100 retrieves (515) values for each of these variables that correspond to the participant with a SSN of 999-99-9999.

The system 100 generates (518) an access key using the mapping rule and the retrieved values. Using Table 3, the system 100 inserts the value "Exempt" for the mapping element "Hourly/Salary" and the value "Yes" for the mapping element "HighlyComp". The system 100 appends these values to generate (518) the access key is XX8052HRPRBonusExemptYes.

The system 100 uses the generated access key to determine (521) whether there are any program identifiers that match the access key. Using Table 2 for example, the system 100 determines that there is a match to the ABC Corp. ABC Corp. Bonus Plan—Highly Compensated Employees. The system 100 retrieves (524) that matched benefits program from the respective database (e.g., 106*d*), or at least retrieves its title and other location information, so that the title can be used as a hyperlink in a displayed list (e.g., the first area 403 of the display 400). The system 100 determines (527) whether there are any additional applicable mapping rules. In this example, there are only those two benefits programs for the client ABC Corp. Not finding any additional applicable mapping rules, the system 100 generates (530) the display (e.g., the first area 403 of the display 400) listing the two plans that the participant 999-99-9999 can view.

The two examples of mapping rules and generated access keys used variables that represented characteristics of the participant (e.g., Salary/Hourly indicator, highly compensated indicator) and variables that represented characteristics of the benefits program (e.g., status, plan type, plan code). Tables 4 and 5 include additional examples of both. Table 4 includes additional examples of characteristics of the participants that can be used for generating benefits requirements identifiers, mapping elements used in mapping rules, and variable values used for generating an access key for a participant. For the characteristics of the participant, there may be a one to one relationship or a one to many relationship with the participant identifier (e.g., SSN) and the client. For example, participants may have 401(k) plans with more than one client in the system 100.

TABLE 4

| Characteristic Information Factors | Description & Notes |
|---|---|
| Client id | Client identifier |
| SSN | Social Security Number |
| FT/PT indicator | Full Time, Part Time |
| Hourly/Salary indicator | Hourly, salary (exempt, non exempt) |
| Pay class | |

TABLE 4-continued

| Characteristic Information Factors | Description & Notes |
|---|---|
| Geographic Region | Geographic region or state in which person |
| Work state | works. |
| | State Restriction could apply to STD. |
| State of Residence | |
| Country | Country restriction could apply to STD. |
| Company Code | Company to which the person is assigned. |
| Organization Code | Organization to which the person is assigned. |
| Division Code | Division to which the person is assigned. |
| Department Code | Department to which the person is assigned. |

Table 5 includes additional examples of characteristics of the benefits programs that can be used for generating benefits requirements identifiers, mapping elements used in mapping rules, and variable values used for generating an access key for a participant. For the characteristics of the benefits programs, there can be a one or many to zero, one, or many relationship with the client and the participant identifier (e.g., SSN). In other words, for each client or participant identifier, there are zero to multiple benefits programs with which that identifier is associated.

TABLE 5

| Plan Information Factors | Description & Notes |
|---|---|
| Program Name | Active, Retiree, Cobra |
| Program Code | Program Code: ACT, COB, INA, RET |
| Program ID | Program ID: Numerical unique id |
| Plan Type Name | Medical, Dental |
| Plan Type Code | Plan Type Code: ADD, MED, DEN |
| Plan Type ID | Plan Type ID: Numerical unique id |
| Plan Name (HOBS) | Harvard, Tufts |
| Plan Code | Plan Code: 804, 201 |
| Plan ID | Plan ID: Numerical unique id |
| Option Name (HOBS) | Dependents, Individual + One |
| Option Code | Option Code: P1, P5 |
| Option ID | Option ID: Numerical unique id |
| Effective Start Date | Participant plan coverage effective start date. |
| Effective End Date | Participant plan coverage effective end date. |
| Life Event Date | Life event date contains the annual enrollment |
| Need to confirm other related LE dates on the HOBS the system. | date. The annual enrollment date would be the next plan year i.e. 010103. |
| Annual Enrollment Indicator | Yes or No |
| Annual Enrollment Date | Date |
| Prior Plan Year Date | Date |
| Prior Plan Year Indicator | Yes or No |
| Eligible Indicator | Yes or No |
| Enrolled Indicator | Yes or No |

Filtering of Content by a Particular Role of a User

In addition to filtering the benefits programs available to view by a participant, the system 100 (e.g., the viewing filtering module 209) can also filter what content is viewed. In one example, the system filters content based on the role of the user viewing the content. As an illustrative example, the participant 112*b* has accessed her 401(k) plan that the employer provides to initiate a loan. While participant the 112*b* is attempting to perform this self-help transaction through Web server 115, she is probably not interested in other content about the 401(k) plan not related to taking out a loan. Even more narrowly, she is probably only interested in the content that corresponds to the specific part of the transaction she is performing at that time. For example, when asked to enter an amount for the loan, she would like to know what the rules are (e.g., minimum of $5,000 and maximum of 50%) for her 401(k) plan. If the participant 112*b* encounters problems or has questions, she may call the CSS user 121. The CSS user 121, to help her resolve her problems and questions, is going to want more of the content than just that related to specific task the participant 112*b* is performing. For example, the CSS user 121 may want all of the content related to the employer's 401(k) plan that describes taking out a loan, or the CSS user 121 may want the content for the entire 401(k) plan. To accomplish this, the system 100 provides different levels of granularity to view the content of a benefits program.

The system 100 stores the contents of a benefits program as several content elements. Some content elements have relationships to other content elements. The relationships provide a process to the system 100 to determine whether changes to one content element may affect another content element. The system 100 also uses another entity, referred to as a collection, to group content elements together that might be applicable for different roles of users of the system 100. Using the 401(k) plan example, the content elements for the 401(k) have the granularity so that one or a few content elements are used to describe each transaction that a participant can accomplish on their own using user interface 115. If a few content elements are used, the system can make this a collection. For example, the transaction where the participant selects an amount might have three content elements that describe that particular transaction. The system 100 can define (e.g., using a database table) a collection named "Selecting_a_Loan_Amount" that associates the three content elements with that transaction screen. The system 100 can define a larger collection named "Loan_Requirements" that associates all of the content elements that describe the loan process of that 401(k) plan, including the three content elements in the "Selecting_a_Loan_Amount" collection. The system 100 can define nested collections, meaning the "Loan_Requirements" collection can include a reference to the "Selecting_a_Loan_Amount" collection, as an alternative to referencing each of the content elements individually.

Figure 6:
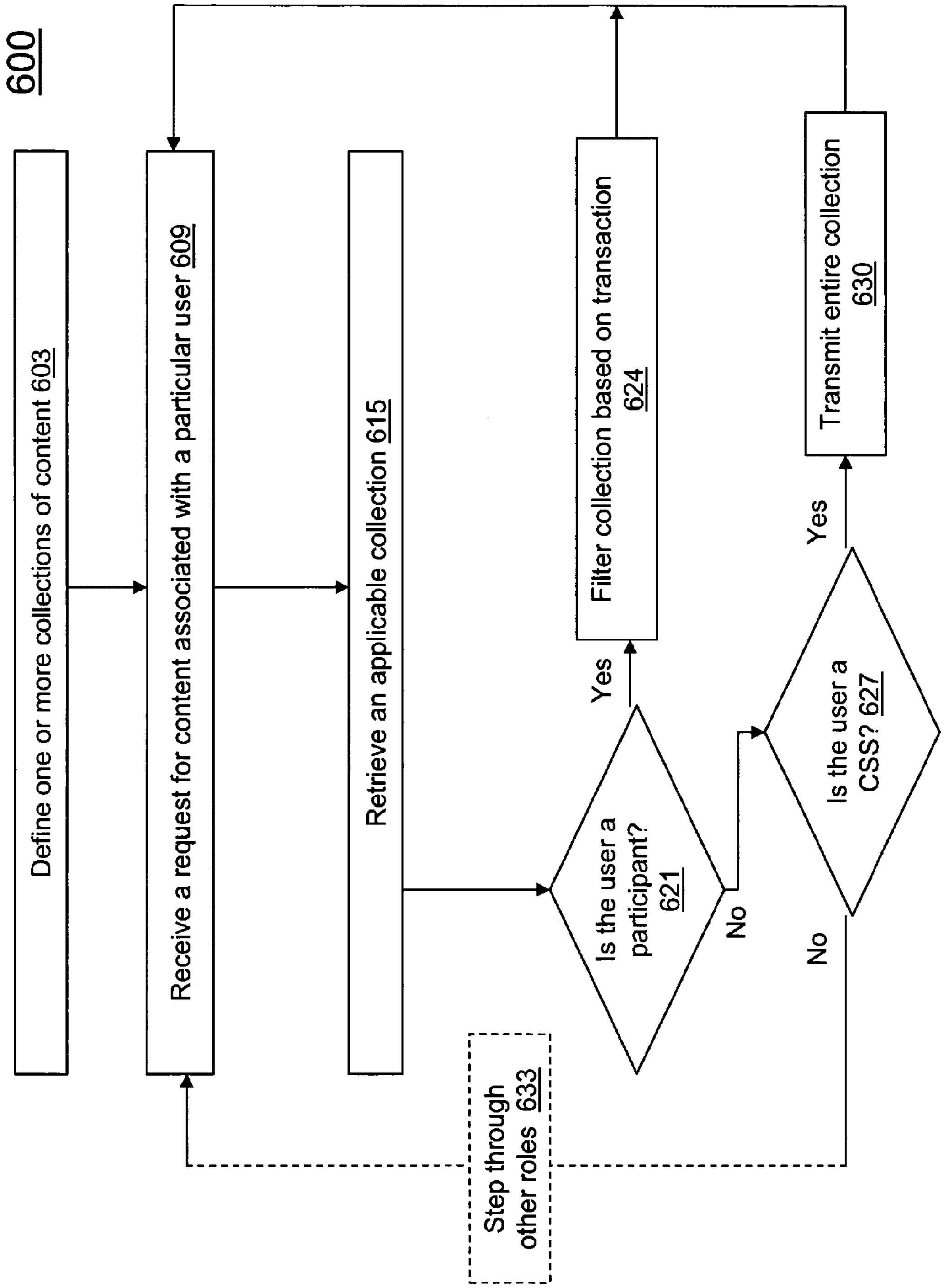
FIG. 6 is another process diagram showing filtering of content.

FIG. 6 illustrates an exemplary process 600 where the system 100 filters content of a collection based on a user's role. The system 100 defines (603) collections of content elements that represent a combination that is of interest to a particular user role of the system 100. The granularity of a collection can vary. The system 100 receives (609) a request for content associated with a particular user. The system 100 retrieves (615) an applicable collection based on the request. For example, if the user is viewing a particular plan (e.g., 401(k) plan) being displayed on a computer the system and the plan includes a hyperlink representing a section (e.g., Loan Requirements), then when the user selects that hyperlink, there is a reference to the "Loan_Requirements" collection. The system 100 determines (621), e.g., using a database lookup based on the authentication credentials, whether the role of the particular user is a participant. If the user is a participant, then the system 100 filters (624) the collection, for example, based on the particular transaction the user is trying to perform, such as choosing a loan amount as described above.

If the system 100 determines (621) that the role of the particular user is a not a participant, the system 100 determines (627) whether the role of the particular user is a CSS. If the user is a CSS, then the system 100 filters (624) the collection, for example, based on the help the user is trying to provide. The filtering rule can be that for a particular transaction a participant is attempting, the system 100 transmits (630) the entire collection containing that transaction, such as the entire "Loan_Requirements" collection. If the system 100 determines (627) that the role of the particular user is a not a CSS, the system 100 can step (633) through other roles and apply the predetermined rules established for that role. For example, for a content author, the collection could be filtered by whether that content author is the author of a content element, allowing the content author to view only those content elements in the collection, for which he is an author. The rule for filtering content can also be based on security issues.

In one example implementation, the system 100 uses a Web services paradigm to retrieve and filter content. In such an example, the collections can be transferred between modules using extensible markup language (XML). The content elements and the collections can also be implemented using objects, where object-oriented technology is employed.

3. Changing Content

In addition to enabling users to view the content in the repository 103*b*, the system 100 also enables the content authors 141 to change the content when problems (e.g., typographical errors) are found and when benefits programs change. When the system 100 is used to provide the content to participants as an outsourced service to a client (e.g., an organization), the system 100 includes benefits programs from a large number of different clients. The system 100 is scalable, so that as the number of clients grows and the content in the repository 103*b* grows, the number of content authors 141 and the number of transactions they can accomplish can also grow. The features described below enable this scalability.

Multi-User Authoring

Figure 7:
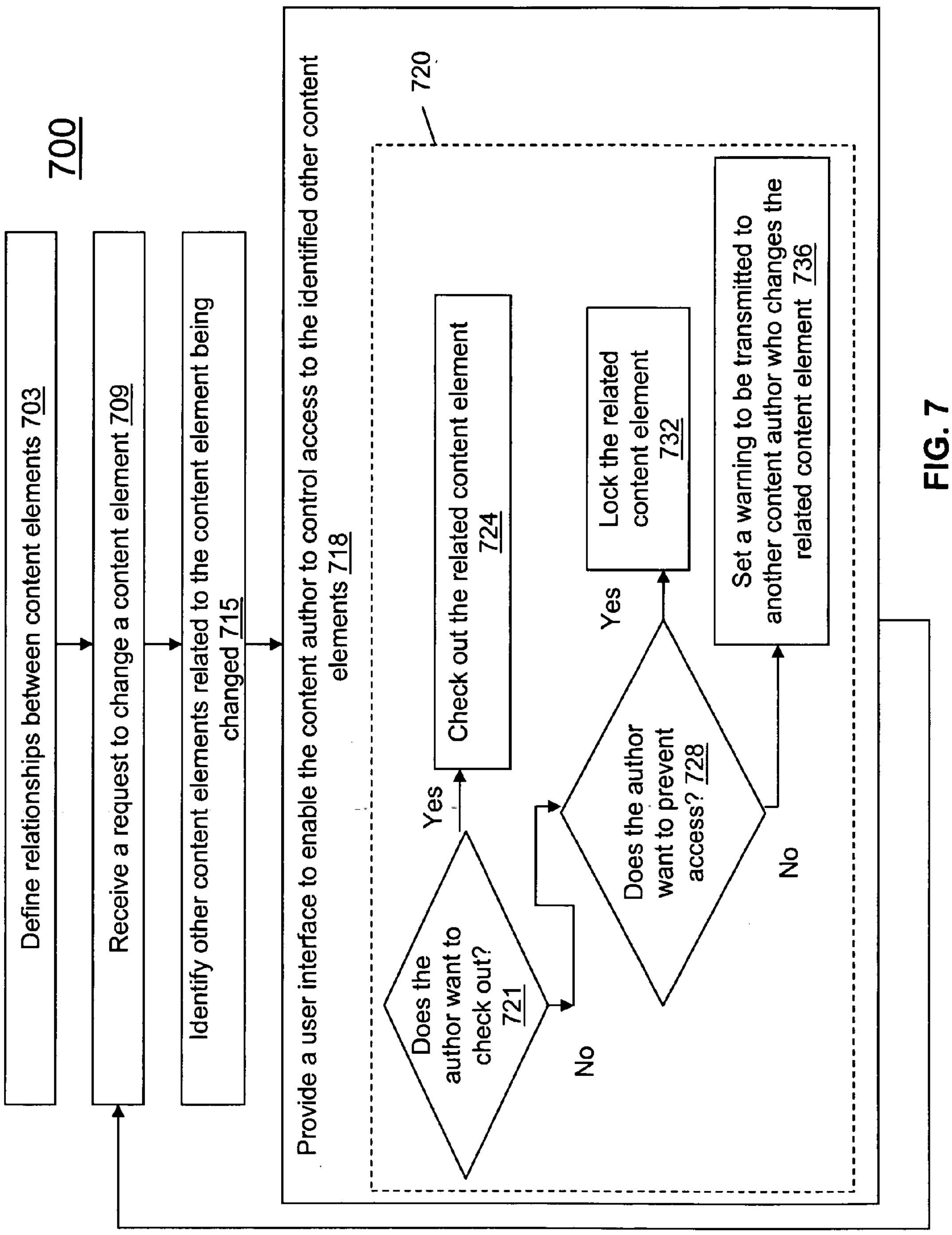
FIG. 7 is a process diagram showing access control of content.

The system 100 includes the multi-user authoring module 203 to provide a process to handle multiple authors. FIG. 7 illustrates an exemplary process 700 to manage multiple authoring in the system 100. The system 100 defines (703) relationships between content elements. As described above (e.g., FIG. 3), the system 100 can define relationships between content elements that have a dependency with other content elements. For example, a relationship can be defined when one content element is used in another content element, when a variable is used with a particular content element, and when a question content element for a particular variable is used in a process to obtain a value for a variable. When the content author 141 wants to make a change to a content element, the system 100 receives (709) a request from the content author 141 identifying the particular content element (e.g., CE1). The system 100 identifies (715), e.g., a database lookup, the other content elements with relationships to the content element that the content author 141 is going to change. For example, if CE1 (FIG. 3) is the content element identified in the request that the content author 141 wants to change, the system 100 identifies that CE2, CE3, CE4, and CE5 have a relationship to CE1.

The system 100 provides (718) a user interface to the content author 141 identifying these related content elements and enables the content author 141 to control the access to these related content elements while the content author 141 is making the change. In some examples, the system 100 includes a sub-process 720 that is performed for each of the related content elements. In sub-process 720, the system 100 determines (721) whether the content author making the change wants to check out the related content element. The system 100 can determine (721) this, for example by providing a check box element (e.g., 820, FIG. 8) in the user interface that the system 100 provides (718). If the system 100 determines (721) that the content author does want to check out the related content element, the system 100 checks out (724) the related content element. For example, the system 100 marks the content element as checked out in the repository 103*b* and allows access to that content element by the content author making the change. In some examples, the system 100 makes a copy of the checked out (724) content element and puts the copy into a working area, such as a local database (e.g., residing on the content author's computer, such as 3112, FIG. 31), so that the content author can make changes to the local copy. In such examples, the changes to the local copy have to be moved back to a centralized database (e.g., 3118 FIG. 31) so that they can be incorporated into repository 103*b*.

If the system 100 determines (721) that the content author does not want to check out the related content element, the system 100 determines (728) whether the content author making the change wants to lock the related content element. The system 100 can determine (728) this, for example, by providing (718) a check box element (e.g., 820, FIG. 8) in the user interface. If the system 100 determines (728) that the content author does want to lock the related content element, the system 100 locks (732) the related content element. For example, the system 100 marks the content element as locked out in the repository 103*b* and prevents access to that content element by any other content author requesting to make a change to that related content element.

If the system 100 determines (728) that the content author does not want to lock the related content element, the system 100 sets (736) a warning that is associated with the related content element. For example, the system 100 marks the content element in the repository 103*b* with an indicator so that the system 100 generates a warning when another content author requests to make a change to that related content element. The warning (e.g., 1000, FIG. 10) indicates that other related content is being changed by another content author.

Figure 8:
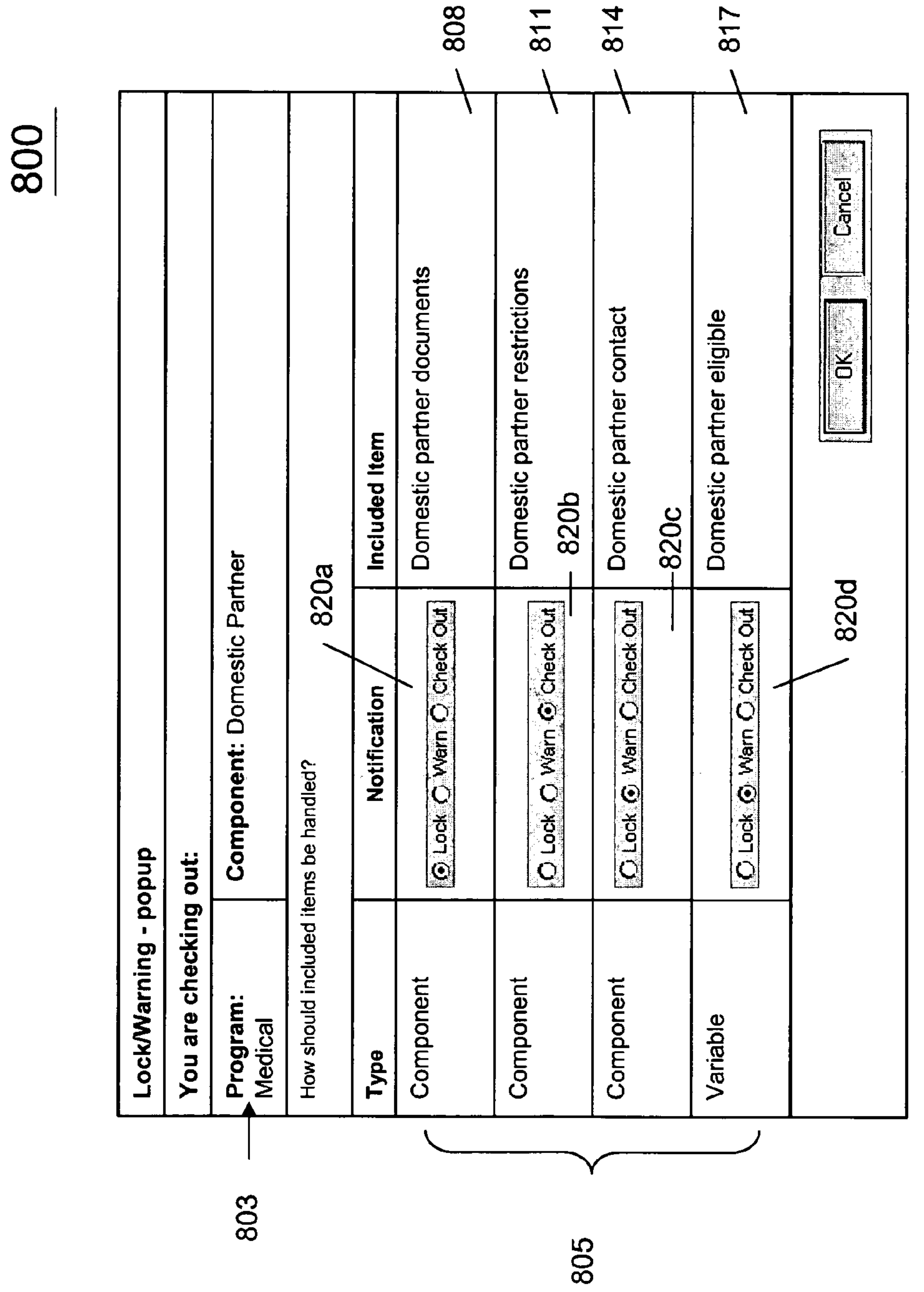
FIG. 8 is a user interface to control access to content.
Figure 9:
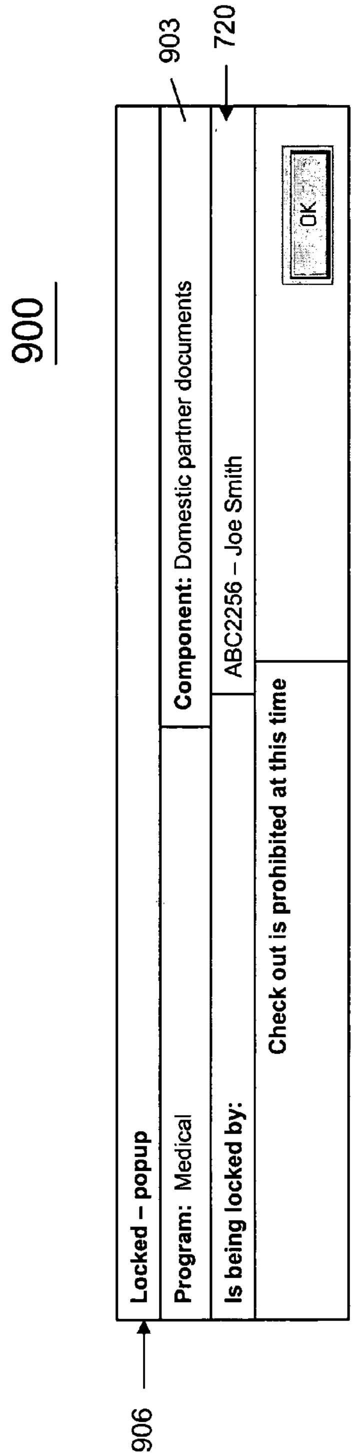
FIGS. 9-26 are other user interfaces to control access to content.
Figure 10:
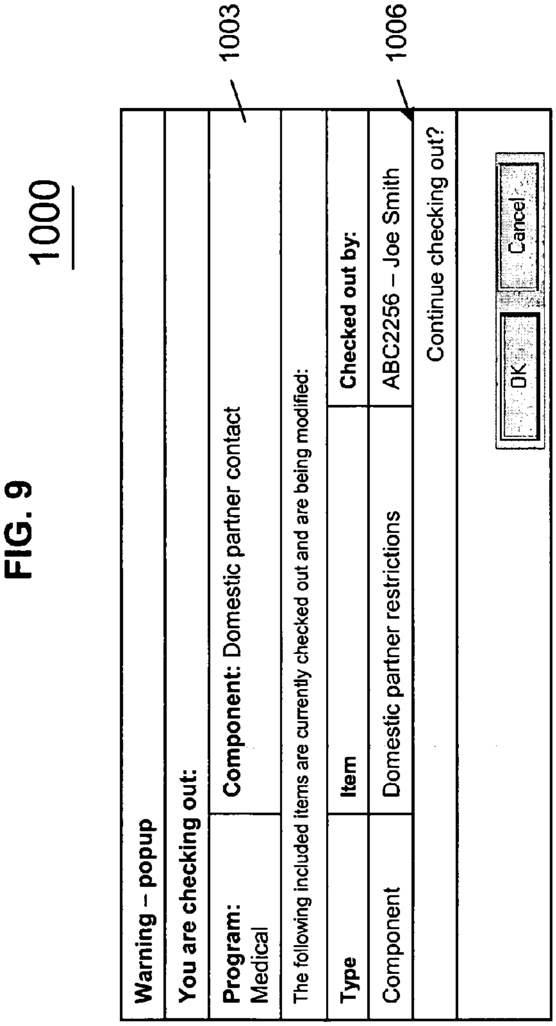

FIGS. 8-10 illustrate screen shots of different user interfaces that the system 100 can use when implementing the process 700. FIG. 8 illustrates a user interface 800 that identifies the content elements that are related to a content element that a content author is changing. In a first area 803, the user interface 800 identifies that the content element (e.g., component) that the content author is checking out to change is titled "Domestic Partner" and is part of a medical plan. In a second area 805, the user interface 800 identifies the content elements that are related to the content element titled "Domestic Partner". The user interface 800 describes the related content elements as included items. One type of relationship between content elements is content elements (e.g., variables or other content elements) that are included in a content element.

In the second area 805, the user interface includes four rows 808, 811, 814, and 817—one row for each related content element. Row 808 corresponds to the related component "Domestic partner documents", row 811 corresponds to the related component "Domestic partner restrictions", row 814 corresponds to the related component "Domestic partner contact", and row 817 corresponds to the related variable "Domestic partner eligible", which is a Boolean variable indicating whether or not a domestic partner is eligible for medical coverage under this plan. Also included in the rows are check boxes 820*a-d*, generally referred to as 820, that enable the content author changing the component "Domestic Partner" to control access to the related content elements in rows 808, 811, 814, and 817, respectively. In the check boxes 820*a-d*, the content author can select to lock, to warn, and to check out each of the related content elements.

In the user interface 800, the content author has indicated to the system 100 that he wants to lock the "Domestic partner documents" (e.g., using the selection button in check box 820*a*) and check out "Domestic partner restrictions" (e.g., using the selection button in check box 820*b*). Instead of automatically locking or checking out all of the related content elements and preventing access to other content authors, user interface 800 advantageously enables the content author to prevent access. This way, the content author, who knows what the scope of the change is, can lock only those content elements that the content author knows should be locked due to the particular change. Similarly, the content author only checks out those content elements that he needs to check out to make corresponding changes. In the user interface 800, the content author has indicated to the system 100 that he wants to set a warning for the "Domestic partner contact" content element (e.g., using the selection button in check box 820*c*) and the "Domestic partner eligible" content element (e.g., using the selection button in check box 820*d*). This leaves those content elements available to other content authors, so that other content authors can change those content elements in parallel (e.g., simultaneously).

For the related content elements that the content author checks out, the system 100 can generate a recursive popup window (e.g., another user interface 800) for each included item that is also checked out. In the example above, the system 100 can spawn another window for the "Domestic partner restrictions" component. If the content author makes modifications to one of the included variables or components, the system 100 allows the content author to check them in separately. The system 100 tracks the content elements as a single group to ensure that at the end, the content author checks in all of the related content elements. In one example, when the content author checks in the original component (e.g., "Domestic Partner"), the system 100 generates an auto check in window (not shown) that requires the author to check in the items (e.g., any related content elements) not previously checked in. At this time, all locked content elements are also marked as unlocked.

FIG. 9 illustrates an exemplary user interface 900 that the system 100 generates when a content author locks a related content element. The user interface 900 includes a first area 903 that identifies the content element (e.g., Domestic partner documents) that another content author is trying to access. A second area 906 indicates that the content area identified in the first area 903 is being locked. A third area 909 indicates that the content area identified in the first area 903 is not available for check out. A fourth area 912 identifies the content author, in this case by user ID and name, who has locked the content element. This enables the other content author to contact the content author who locked the content element (if desired).

FIG. 10 illustrates an exemplary user interface 1000 that the system 100 generates when a content author has set a warning for a related content element. The user interface 1000 includes a first area 1003 that identifies the content element (e.g., "Domestic partner contact") that another content author is trying to access. A second area 1006 indicates a content element that is related to the identified content area in the first area 903. Because a warning was set for the "Domestic partner contact" content element (e.g., using the user interface 800), the second area 1006 identifies the type, name and content author of any of the related content elements that have been checked out by another content author, and therefore could end up modified from their current state. The second area 1006 identifies that in this example, a component titled "Domestic partner restrictions" has been checked out by a content author with a user ID of "ABC2256" and a name of "Joe Smith". With this knowledge, the content author viewing user interface 1000 can continue with the check out process for the "Domestic partner contact" content element or wait, based on the possible changes to the checked out related content element.

Access Control Based on a Particular Role of a User

Figure 11:
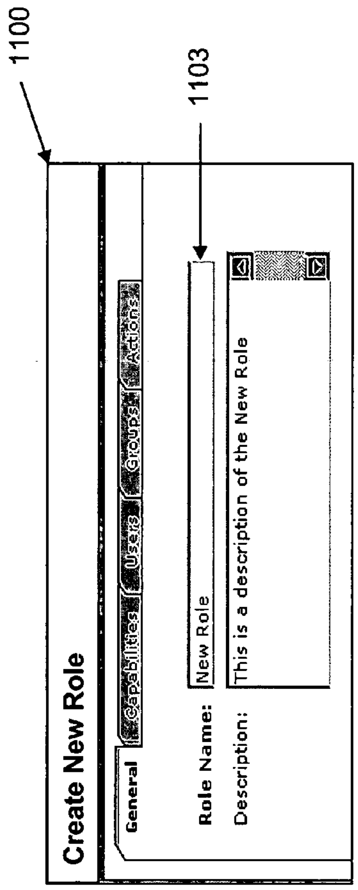

Similar to the controlling the viewing of content based on user roles described above, the system 100 can also control the changing and Web-based delivery of content based on user role. User access for changing content and user access for viewing the content delivery through a Web browser can be configured separately. FIGS. 11-26 illustrate exemplary user interfaces that enable an administrator to control access to content based on user roles. FIG. 11 illustrates a graphical user interface to enable the creation of user roles in the system 100. For example, the system 100 can further define the content author 141*a* role into content author full access, which indicates that the content author 141*a* can have access to all of the content in repository 103*b*. The system 100 can define a content author role indicating a restriction to a specific practice, such as content author HI, which indicates a restriction to the HI database 106*c* and the HI benefits programs content in the centralized database 106*e*. The system 100 can define a content author role indicating a restriction to a specific client, such as content author ABC Corp., which indicates a restriction to benefits programs associated with the client ABC Corp. A user is associated with a defined user role, for example, indirectly by associating a role name with one or more user groups (e.g., using NT groups or LDAP groups) and/or directly by associating a role name with the user directly (e.g., using user IDs).

For these roles, and any other that can be defined, the system 100 generates the exemplary user interfaces in FIGS. 11-26 to enable the administrator to explicitly define these user roles.

Figure 12:
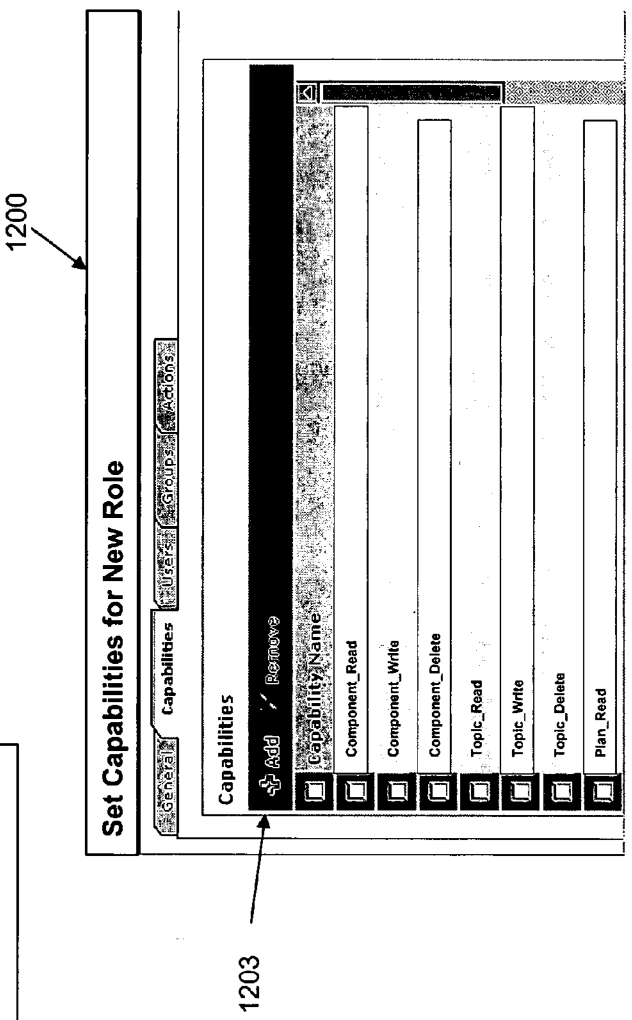
Figure 13:
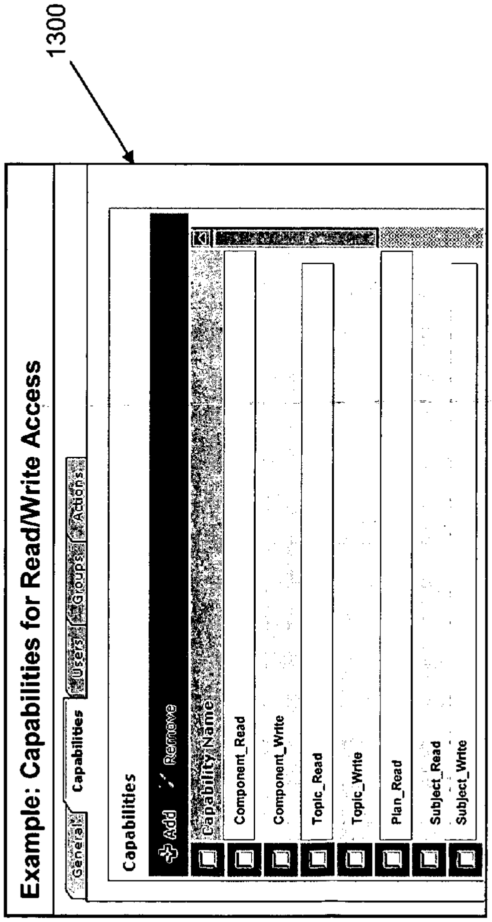
Figure 14:
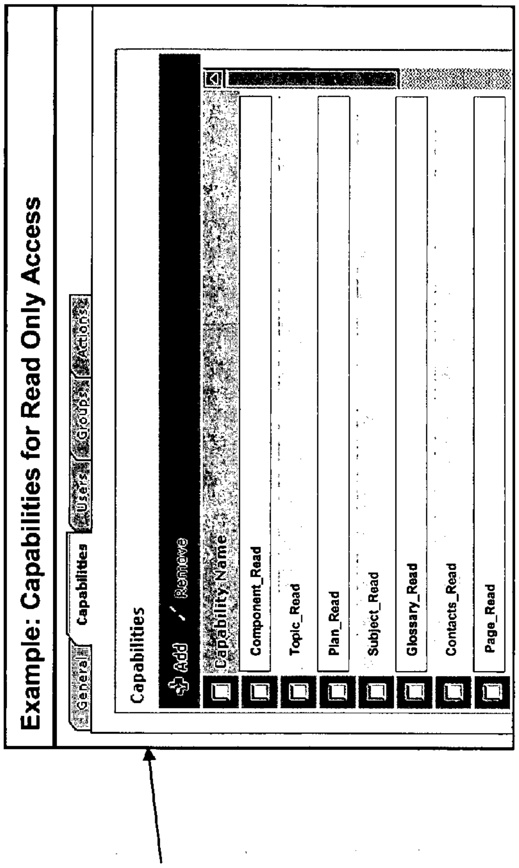
Figure 15:
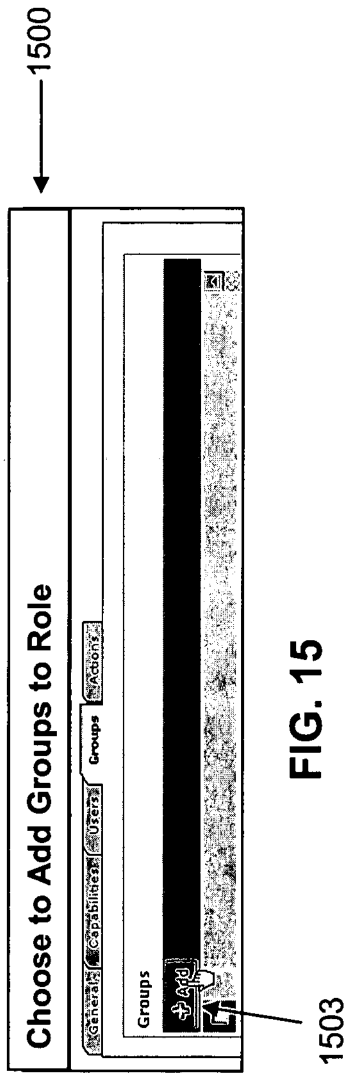
Figure 16:
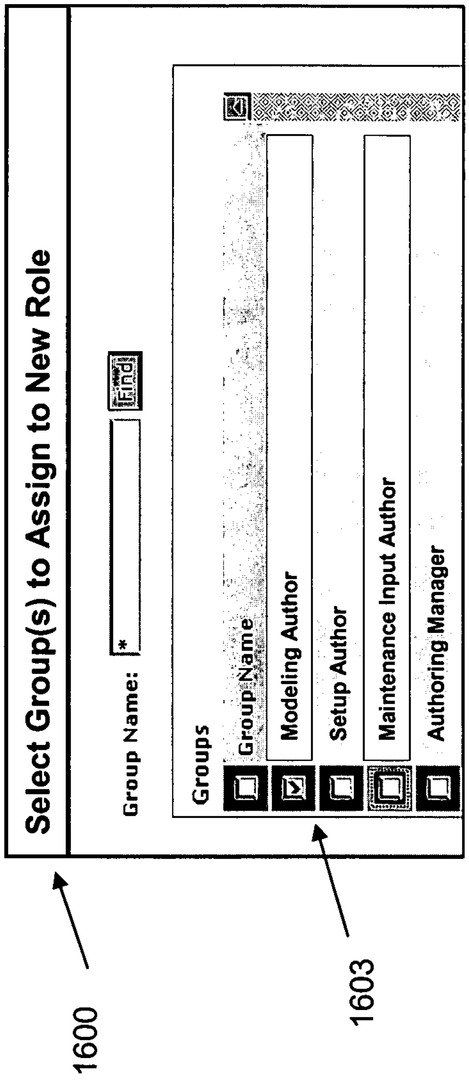

FIGS. 11-16 illustrate an administrator's ability to grant security access for content types as a group of content assets (e.g., all components, plans, subjects). FIG. 11 illustrates a user interface 1100, which includes an area 1103 where an administrator can enter the name of the role being defined. FIG. 12 illustrates a user interface 1200, which includes an area 1203. The area 1203 includes an interface that enables the administrator to select a criterion on which access will be based for the named role (e.g., defined in area 1103). The area 1203 includes the read, write, and delete permissions by content asset type (e.g., components, topics, and plans). For example, FIG. 12 illustrates that the user is allowed read, write, and delete capabilities for the "component" content type and the "topic" content type. FIG. 13 illustrates a user interface 1300, which shows read and write capabilities granted for the "component," "topic," and "subject" content types; the user is granted only read access to the "plan" content type. FIG. 14 illustrates a user interface 1400 where the user is solely granted read capabilities on content types (e.g., component, topic, plan). When the administrator selects capabilities for a content type (e.g., component, topic, plan, subject) as in FIGS. 12-14, the system 100 allows any user assigned to the named role (e.g., Author Full Access) to access any content types and instances within that are granted read access, modify any content types and instances within that are granted write access, and delete any content types and instances within that are granted delete access. FIG. 15 illustrates a user interface 1500, which includes a function 1503 that allows the administrator to add user groups (e.g., authors, reviewers) to a role. FIG. 16 illustrates an interface 1600, where the selection of a group 1603 (e.g., modeling author) is made by an administrator. When the administrator selects a group listed in the area 1603 (e.g., Modeling Author), then the system 100 allows any user assigned to the named role (e.g., Author Full Access) to access any content associated with that selected group (e.g., Modeling Author).

Figure 17:
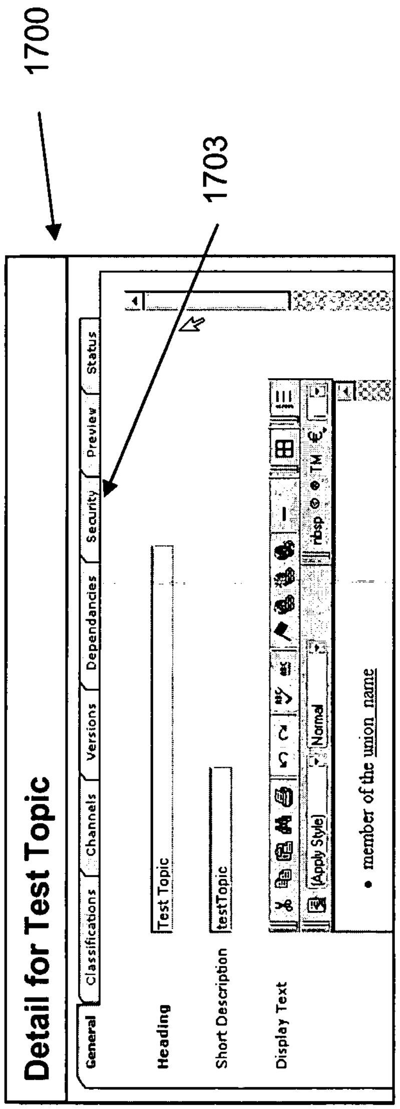
Figure 18:
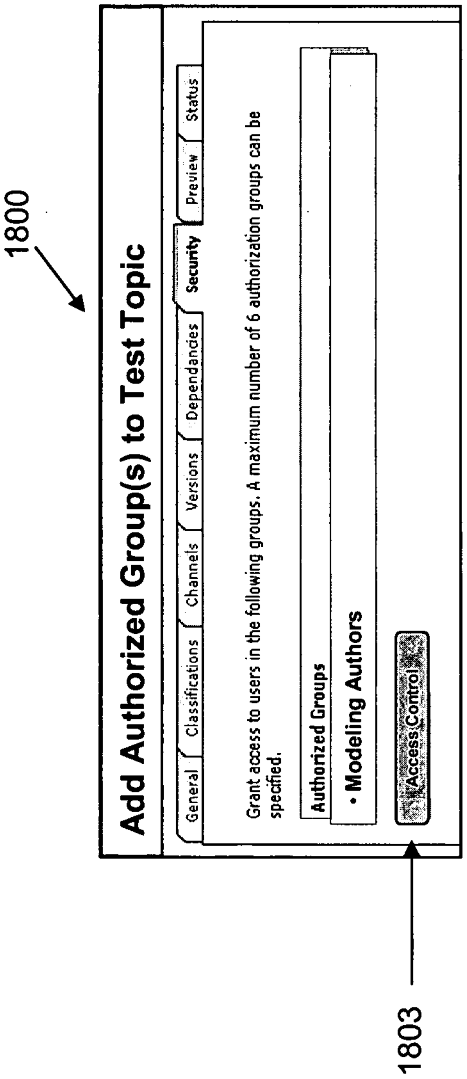

FIGS. 17-18 illustrate the ability to select access groups for an individual content asset (e.g., a single plan, a single component instance, a single topic instance). FIG. 17 illustrates a user interface, 1700, which allows the administrator to select security permissions 1703 for a content instance. Content instances, for example, can be clients, subjects (i.e., plan types), plans. FIG. 18 illustrates a user interface 1800, which allows an administrator to select different user groups to permit access through the use of the access control button 1803.

Figure 19:
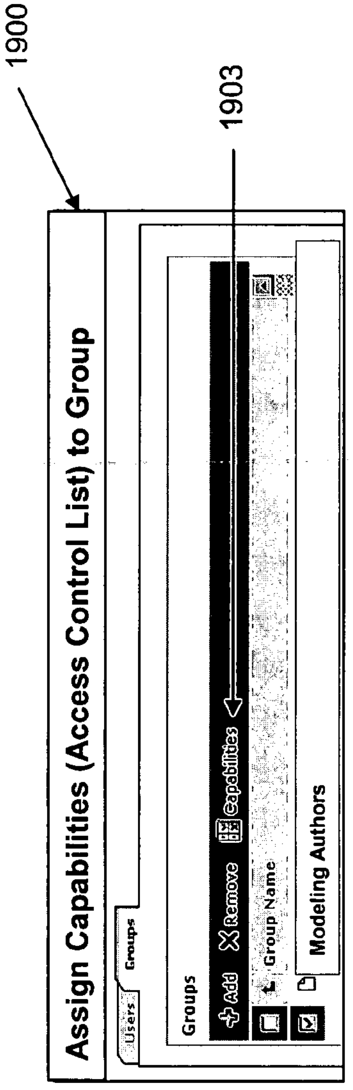
Figure 20:
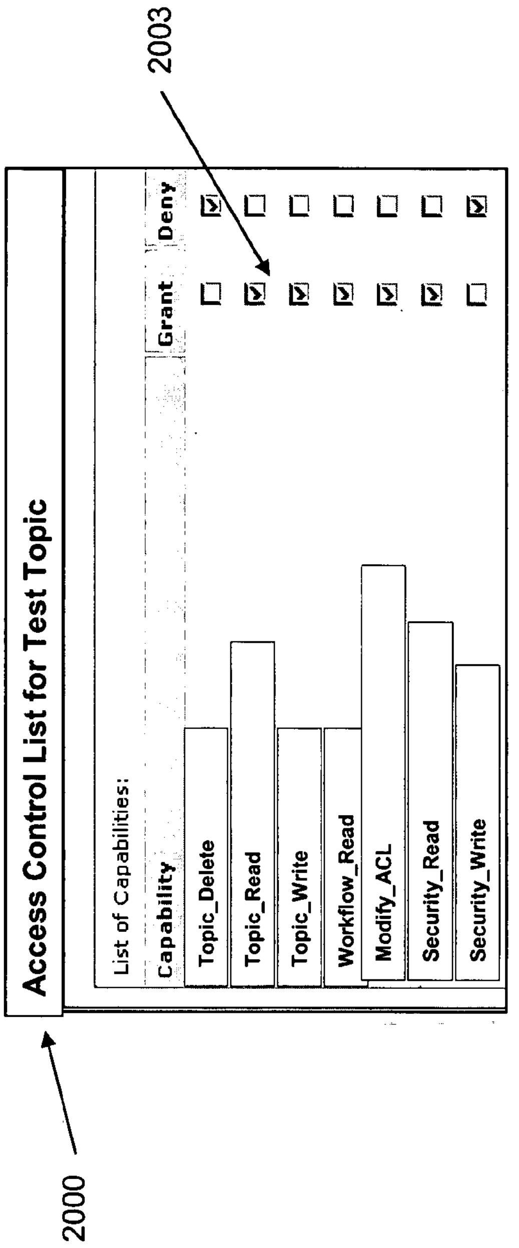
Figure 21:
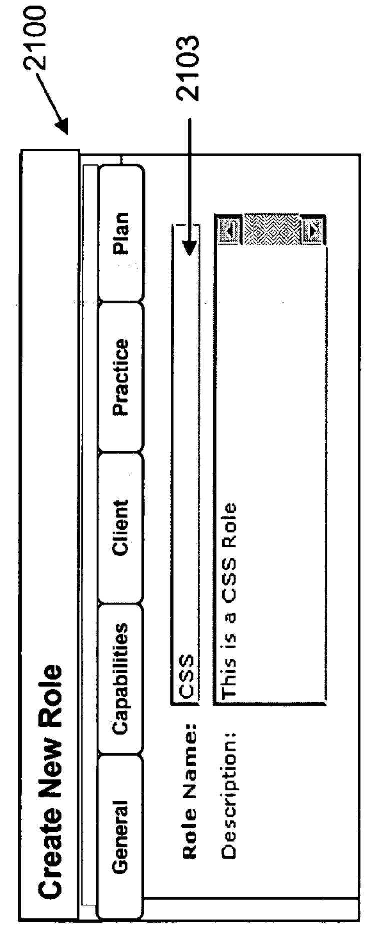
Figure 22:
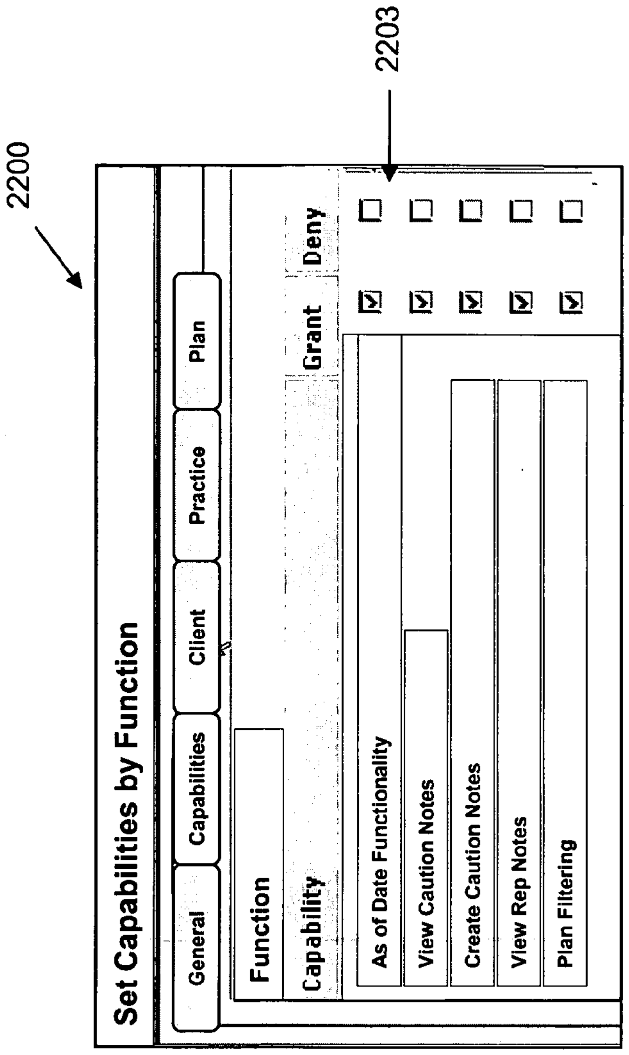
Figure 23:
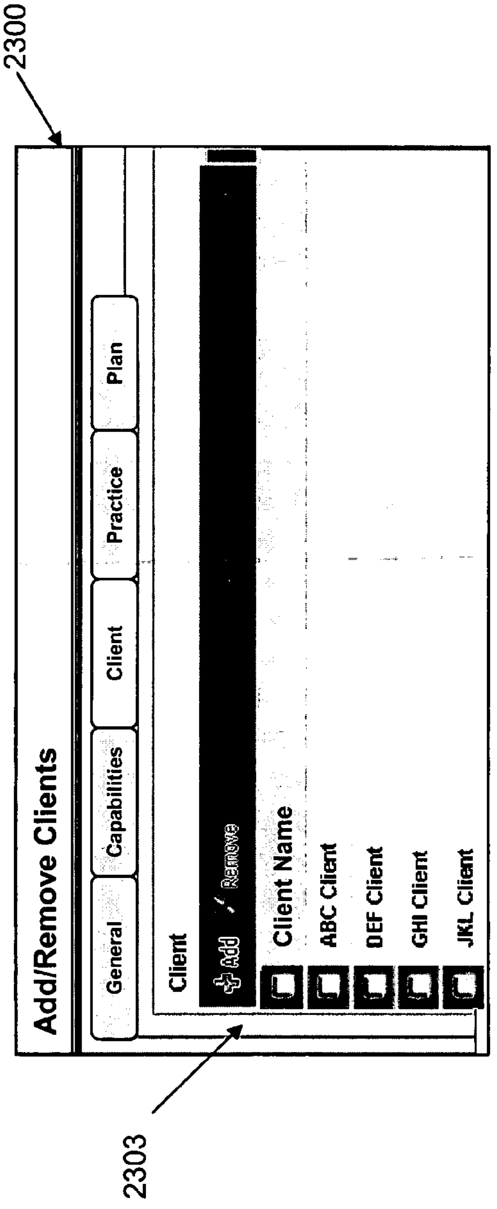
Figure 24:
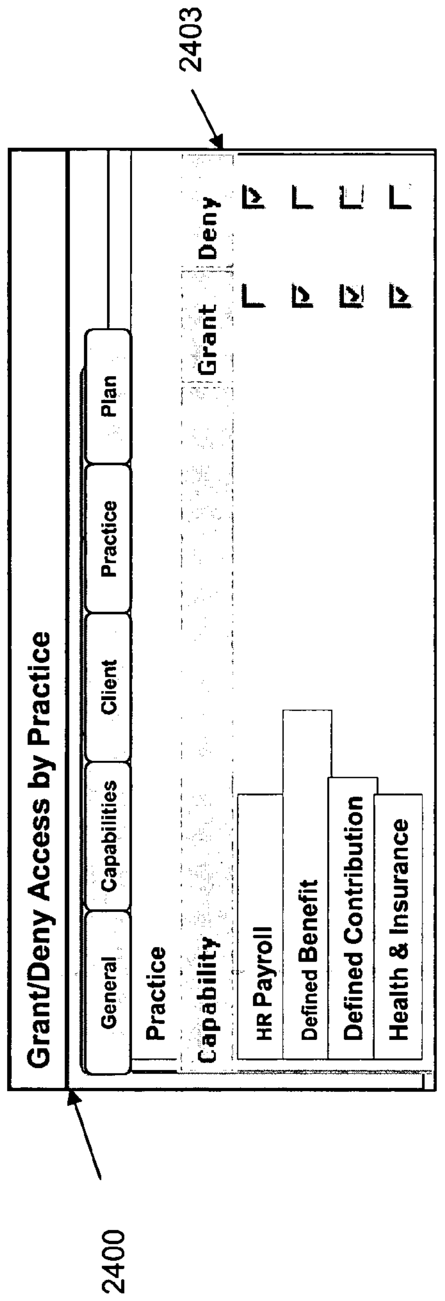
Figure 25:
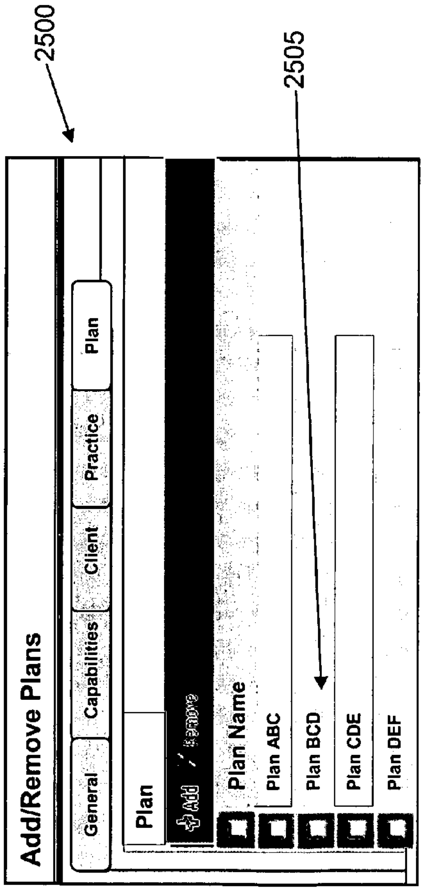
Figure 26:
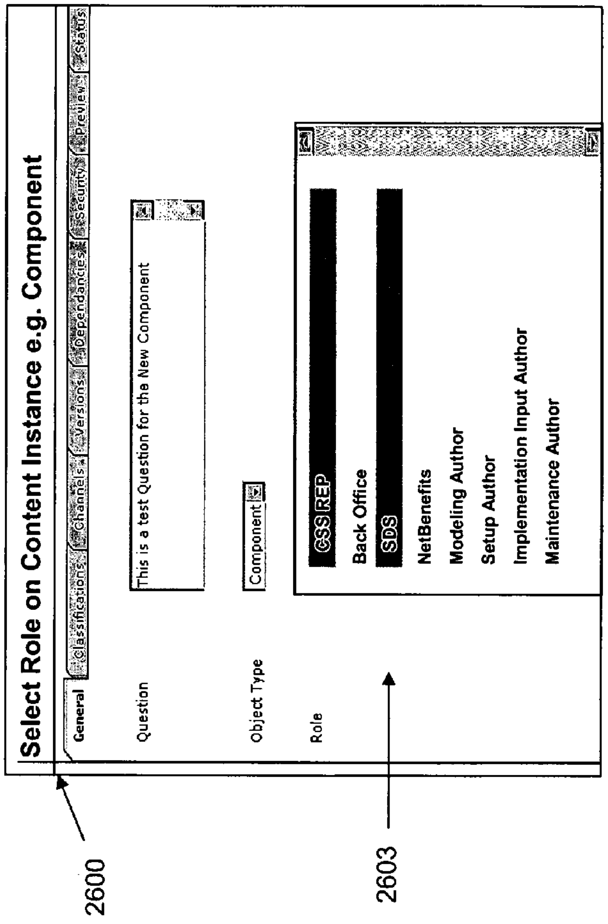

FIGS. 19-26 illustrate additional ways the administrator can assign security at different levels within the system. FIG. 19 illustrates a user interface 1900, which allows the administrator to select access capabilities for a user group by selecting the capabilities button 1903. FIG. 20 illustrates a user interface 2000, which allows the administrator to select the specific access control list of capabilities for a user group. Selection is made by content type (e.g., component, topic, plan, etc.) as well as functional capabilities within the system (e.g., can view workflows, can modify the access control list, can read and write security settings) using check boxes 2003. FIG. 21 illustrates a user interface 2100, which allows the administrator to set up a new user role 2103. FIG. 22 illustrates a user interface 2200, which shows additional application capabilities 2203 used in the Web browser delivery to end users. FIG. 23 illustrates a user interface 2300, which allows the administrator to set permissions based on a list of clients 2303. FIG. 24 illustrates a user interface 2400, which allows the administrator to set permissions based on a list of practices 2403. FIG. 25 illustrates a user interface 2500, which allows the administrator to set permissions based on benefits program. When the administrator selects a benefits program listed in area 2505 (e.g., Plan BCD), then the system 100 allows any user assigned to the named role (e.g., Author Full Access) to access any content associated with that selected benefits program (e.g., Delta dental). FIG. 26 illustrates a user interface 2600, which allows the administrator to set permissions on a content instance (e.g., component instance) based on user role selected from a list 2603.

Restricting access to change content based on the factors above advantageously allows the system 100 to have content changes placed as close to the origin of the change as possible (i.e., in the hands of the "content owner"). For example, phone center senior representatives (e.g., a CSS user 121) are aware of and/or responsible for the contact information like telephone hours and hours of service. The system 100 can enable this using restrictions on multiple levels of objects within the system, including employer restrictions (e.g., FIG. 23), benefits program restrictions (e.g., FIG. 25), and/or the questions restrictions (e.g., FIG. 26). CSM users 134, or plan sponsors, work with clients 138 directly and are responsible for the plan data and content (how the plan works, what are the plan rules, etc.) for those clients with whom they work. The CSM users 134 are able to change certain plan data elements that drive plan content for their plans. The system 100 can enable this using the employer restrictions (e.g., FIG. 23). In addition, users can be restricted to different views of the content from a production capacity. For example, a phone representative, only trained to service defined contribution calls, should not have access to medical plan information. The system 100 can enable this using the benefits program restrictions (e.g., FIG. 25).

Figure 27:
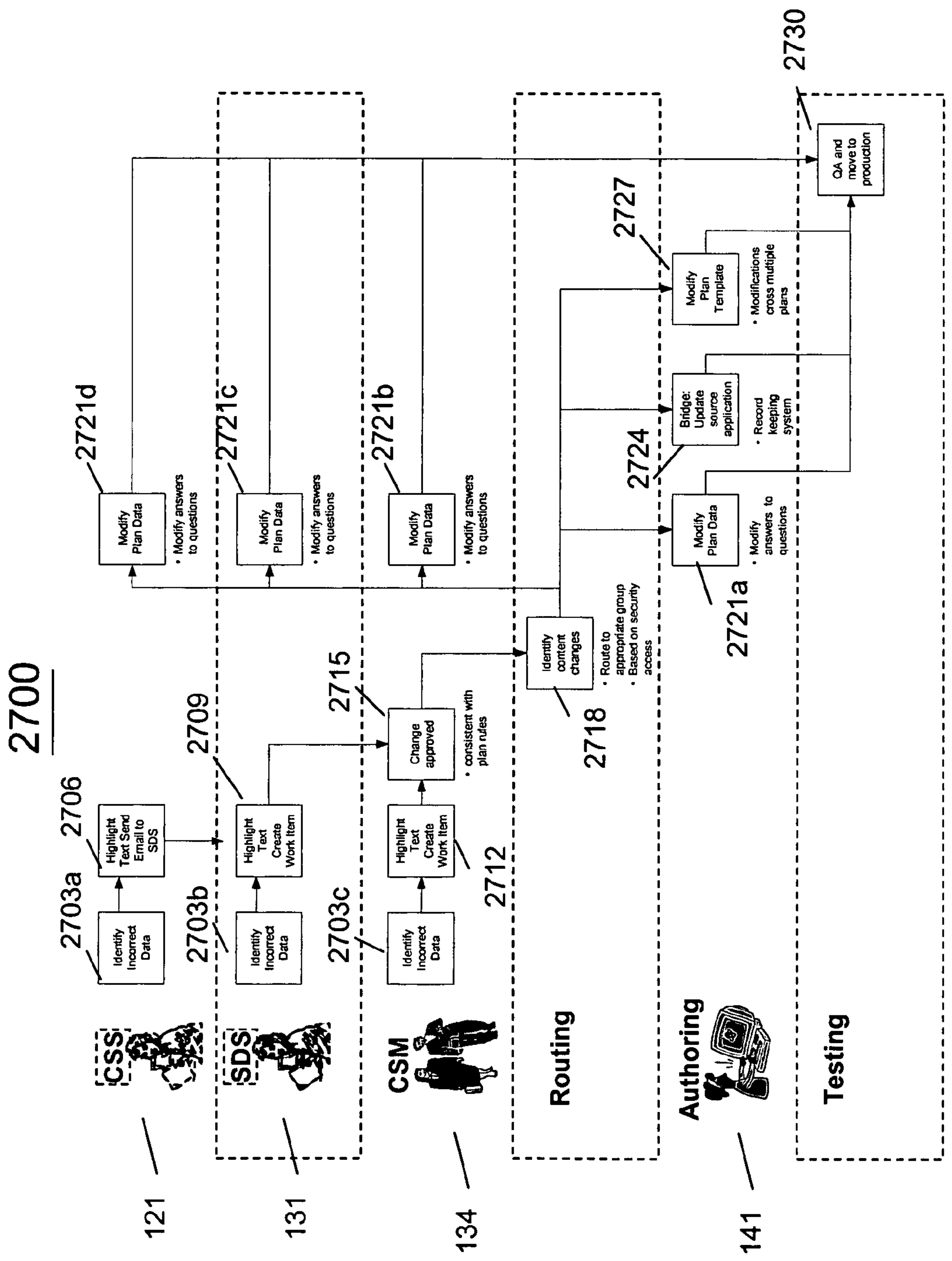
FIG. 27 is a process diagram showing the routing of a change request to change content.

FIG. 27 illustrates an exemplary process 2700 that the system 100 uses to route a change according to the security access settings entered using, for example, the user interfaces described above. Process 2700 shows a change to content moving from an originator of the change to the production of the change (e.g., incorporation of the change into the repository 103*b*). In process 2700, a user, either the CSS user 121, the SDS user 131, and/or the CSM user 134, identifies (2703) incorrect data in a portion of content. If the CSS user 121 identifies (2703*a*) the error, then the CSS user 121 highlights (2706) the error and communicates (2706) the error to the SDS user 131 (e.g., using an email communication). The SDS user 131, upon receiving a communication from the CSS user 121 or after identifying (2703*b*) an error herself, creates (2709) a work item in the workflow process (e.g., 218, FIG. 2). The workflow process moves the change along according to the rules entered into the workflow process and keeps track of the current status of the work item. The CSM user 134 can also create (2712) a work item in the workflow process to track a change that the CSM user 134 identified (2703*c*). The CSM user 134, upon receiving a communication from the workflow process that a change is pending, reviews the pending change and approves (2715) the change for incorporation. The approval allows the work item to be moved (e.g., by the content management module 103*a* and/or the workflow process 218) to the next queue in the workflow process (e.g., change status). In process 2700, the system 100 identifies (2718) the content being changed and routes the change to an appropriate user or user group based on the access control set up for the system 100. As described above, the access can be determined using the content type. For example, the access control can be by component, so that when the system 100 identifies (2718) a particular question and display text (i.e., a component) associated with a particular group of users, the system 100 forwards the change to those users. In this case, the system sends the change to the CSS user 121, the SDS user 131, the CSM user 134, and the content author 141, so that any of them can incorporate (2721) the change. When the system 100 identifies (2718) the content type as components or other changes that affect the content template (e.g., creation of a new subject or topic), the system 100 forwards the change to the content author 141, so that he can incorporate (2727) the change.

In some examples, to incorporate a change (e.g., 2721, 2724, 2727), the content is transferred from a centralized database to a local database associated with the user incorporating the change. For example, a portion of the database is instantiated locally on a computing device associated with the user so the user can access the source of the content and make the necessary changes. In such examples, the changes have to be moved back to the centralized database accessible to all users so that the process 2700 can be completed. An author 141 can also incorporate a change (e.g., 2721, 2727) by making changes directly within the centralized database.

In examples where the workflow process 218 is a process external to the content management module 103*a*, the system 100 uses the quality control module 206 to serve as an interface between the database management and the workflow process, to ensure that changes are automatically processed when a user completes a modification. The quality control module 206 generates a user interface that enables the user making the change to notify the quality control module 206 that the change is completed and ready to be moved back into the centralized database so that the change can be tested (2730) by quality assurance (QA) and moved (2730) to production. For example, the user making the change transfers the modified content to a submit location (e.g., a submit database 3115, FIG. 31) and then changes the status on the user interface, e.g., using a change request status entry button (e.g., a pull down menu), to a status of "Content Submitted." The user making the change can also input into the user interface the location indicator (e.g., path name) of the content ready to be submitted. In response to the change in status, the quality control module 206 queues the changed content for transfer, and moves and integrates the changed content into the centralized database. When the centralized database confirms the transfer, the quality control module 206 changes the status of the change request to "Content Checked In". The use of the quality control module 206 advantageously enables an administrator to review the queue of pending transfers to the centralized database of all of the changed content, which would not be available if each user manually transferred her content back to the centralized database. This review of the queue allows the administrator to manage the queue, (e.g., change priorities, cancel a transfer, and/or manually effect a transfer).

Indicating Pending Changes to Content

Figure 28:
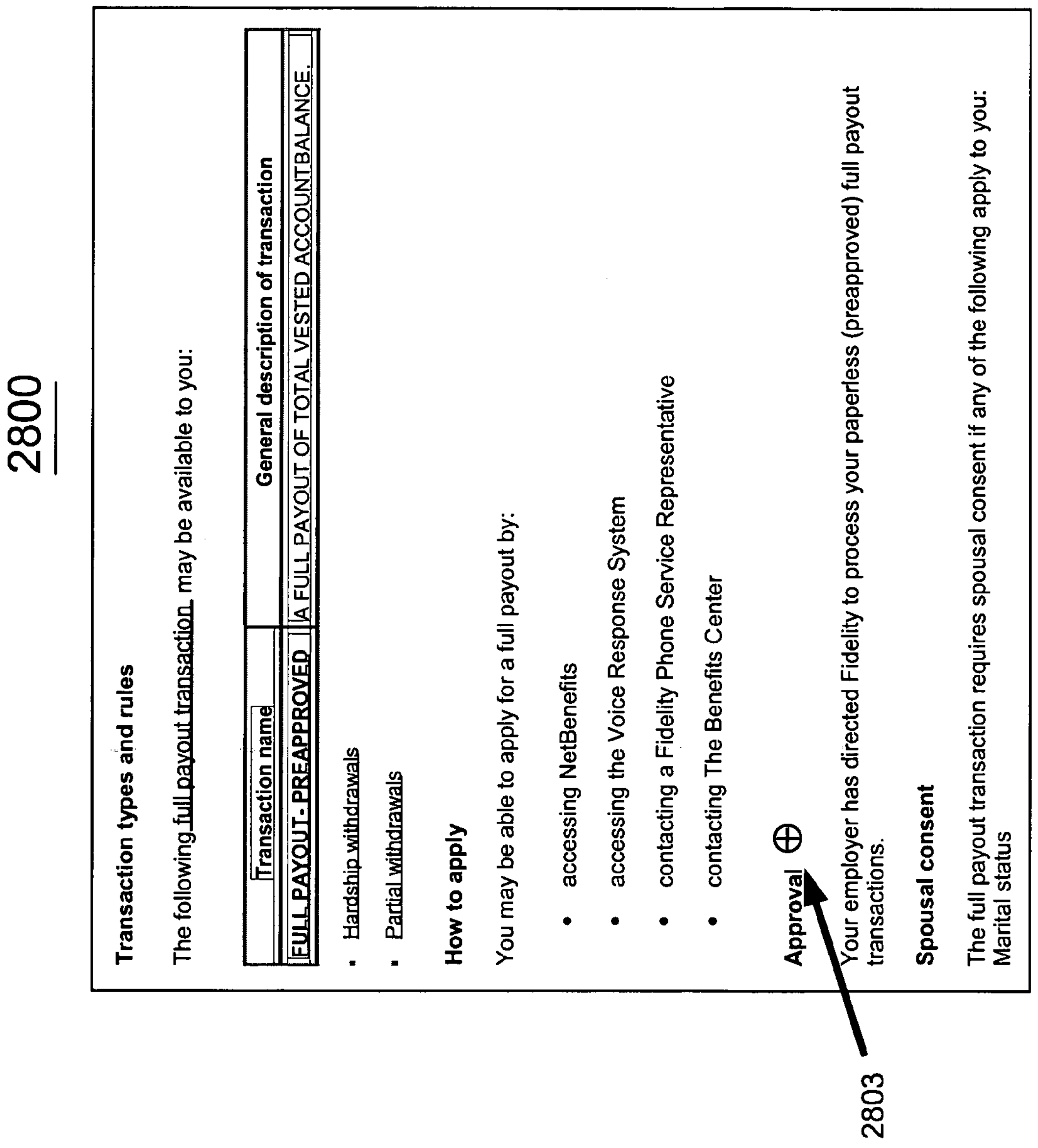
FIG. 28 is a screen shot showing a generated display with a pending content change indicator.

With the processes described above, the system 100 can have pending changes to content that is being viewed (e.g., by a CSS user 121 helping a participant). To give the user viewing the content a more complete picture, the system 100 indicates in the generated view that a change is currently pending for that particular content element. FIG. 28 illustrates a screen shot 2800 that includes an indicator 2803 indicating that the "Approval" section (e.g., the content element that contains that text) has one or more pending changes. This indicator is also referred to as a caution note. The indicator 2803 can also serve as a hyperlink. When the user interacts with the indicator 2803 (e.g., uses a mouse to move the cursor over the indicator 2803 or clicks a mouse button over the indicator), the system 100 generates a description that provides information about the pending changes.

Figure 30:
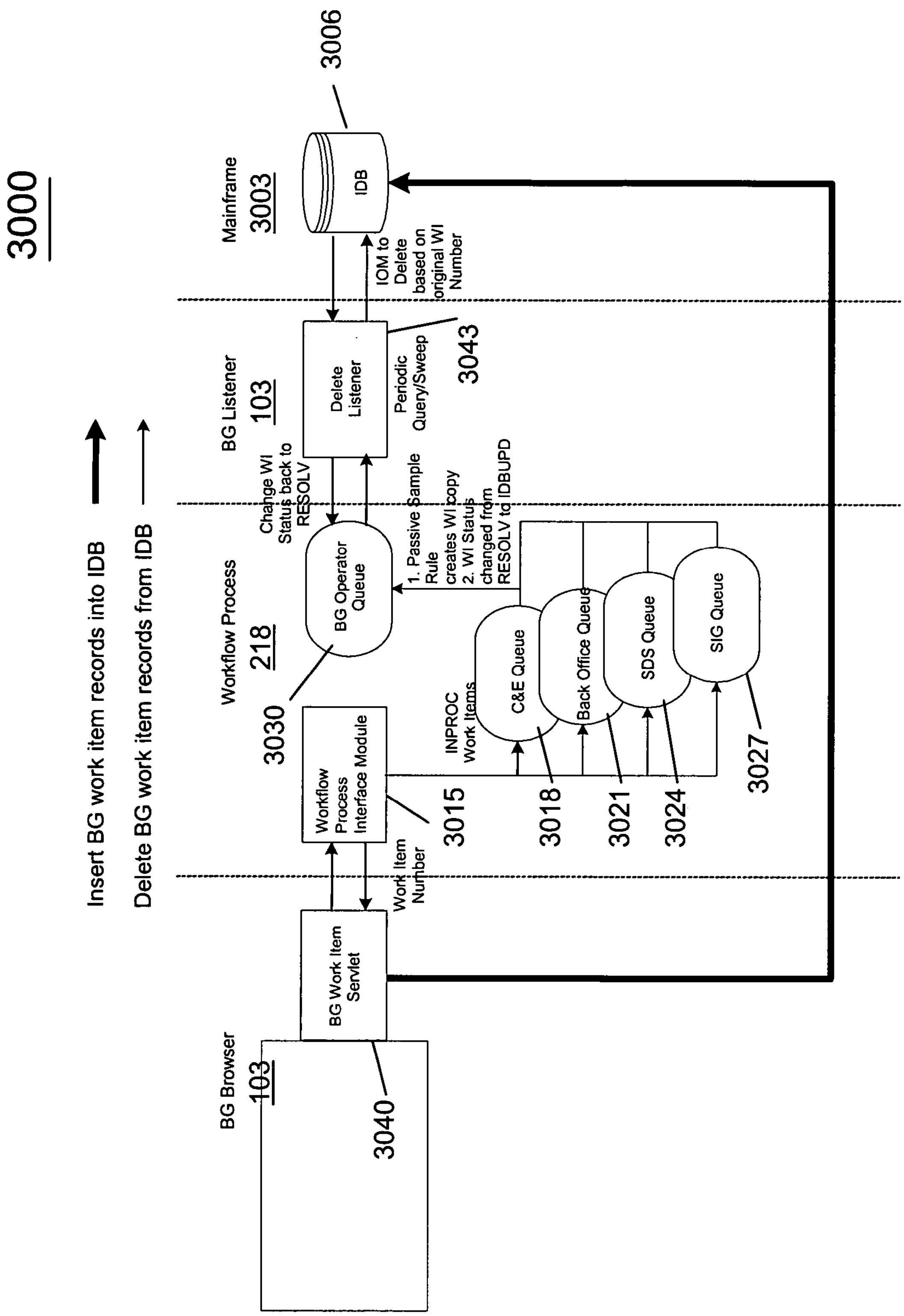
FIG. 30 is a block diagram showing a potion of a benefits content management the system to monitor pending content changes.

FIG. 29 illustrates a screen shot 2900 that includes a text box 2903 that has information about the pending changes. Text box 2903 has a first portion 2903*a* that indicates a first pending change for the "Approval" topic and a second portion 2903*b* that indicates a second pending change for the "Approval" topic. Both portions 2903*a* and 2903*b* have the same type of information. The presentation page being displayed is identified, the topic in which the change appears is identified, and the selected text to which the change applies is identified. In the example, the term "transactions" contains a typographical error, so that term is italicized to further identify the change. Both portions also include a comments section that describes the change and a status section that describes where in the workflow process the change request is located. To provide the indicator 2803 and the descriptions 2903 of the pending changes, the system 100 (e.g., the pending change indication module 212) monitors the workflow process 218 and captures certain data from the workflow process 218 so that the system 100 can provide the pending change descriptions (e.g., 2903) when generating the content for viewing. FIG. 30 illustrates an exemplary the system 3000 that enables this process. The system 3000 includes modules in the benefits guide (BG) 103, in the workflow process 218, and in a mainframe 3003.

The mainframe 3003 includes an integrated database (IDB) 3006, which is a general information database. The IDB 3006 is in communication with the benefits guide 103, if it is not part of the repository 103*b*. The IDB 3006 can include information such as participant information, high-level plan relationship information, client configurations, etc. In the system 3000, the IDB 3006 also includes information about pending changes so that the system 100 can quickly retrieve the pending change information whenever the system 100 is generating content for viewing that has a pending change.

The workflow process 218 includes a workflow process interface module 3015 that allows the BG 103 to retrieve information from the workflow process 218 corresponding to certain work items that the workflow process 218 is handling. For example, the workflow process interface module 3015 can include an API that allows the retrieval of data. The workflow process 218 is configured to assign work items to certain queues based on a set of rules. The workflow process 218 includes a communication and education (C&E) queue 3018, a back office queue 3021, a SDS queue 3024, a SIG queue 3027, and a BG operator queue 3030. The workflow process 218 uses the C&E queue 3018 for work items to be handled by the content authors 141. The workflow process 218 uses the back office queue 3021 for work items to be handled by back office personnel (e.g., document scanners). The workflow process 218 uses the SDS queue 3024 for work items to be handled by the SDS users 131. The workflow process 218 uses the service installation group (SIG) queue 3027 for work items to be handled by SIG users (e.g., SIG users are responsible for configuration of DC plan data in BG and in the record keeping system).

The BG operator queue 3030 is not for any particular users, but is used by the BG 103 to keep track of work items related to the pending changes of content in the BG repository 103*b*. The workflow process 218 has a set of rules to determine when work items going to the other queues (e.g., 3018, 3021, 3024, and/or 3027) should be copied and sent to the BG queue 3030. For example, if the other queues 3018, 3021, 3024, and/or 3027 always deal with work items changing content only in the BG repository 103*b*, then the rule can be to simply copy each work item to the BG queue 3030 as the work item enters into one of the other queues 3018, 3021, 3024, and/or 3027. If there are other areas the workflow process 218 is used for, then the rule can be more sophisticated and look at values of certain parameters of the work item to determine if that work item relates to the BG repository 103*b*. For example, the rule can be to obtain the value the source of content being changed and if that value is one of the databases in the repository 103*b* (e.g., 106*a*, 106*b*, 106*c*, and/or 106*d*), then the workflow process 218 copies that particular work item to the BG queue 3030.

The BG 103 includes a BG work item servlet 3040 and a delete listener 3043 to keep track of the work items sent to the BG queue 3030. The BG work item servlet 3040 and the delete listener 3043 can be, for example, included in the pending change indication module 212. By having the BG queue 3030, the BG work item servlet 3040 and the delete listener 3043 advantageously only have to monitor a single queue. When a new work item enters the BG queue 3030, the servlet 3040 obtains some data needed for the change indication and copies that data to the IDB 3006. Table 6 illustrates an example of the data the servlet 3040 obtains from the workflow process 218 (e.g., using interface module 218) and transfers to IDB 3006 for storage as long as the work item is open.

TABLE 6

| Data Element | Variable type | Definition |
|---|---|---|
| ITEM_TYPE_CODE | CHAR(6) | Work item type code defined by the workflow process 218 |
| CLNT_ID_N | INTEGER | IDB Client ID number |
| PROD_ID_C | CHAR(2) | Product ID code |
| BENF_GUID_PLAN_NM | VARCHAR(255) | Benefits Guide plan name |
| SUBJ_C | CHAR(50) | Benefits Guide subject code |
| PAGE_ID_X | VARCHAR(255) | Benefits Guide page ID |

TABLE 6-continued

| Data Element | Variable type | Definition |
|---|---|---|
| SCTN_X | VARCHAR(255) | Benefits Guide page section name |
| WORK_ITEM_ID | DECIMAL(12) | Work item number |
| STAT_C | CHAR(6) | Work item status code |

The work item type code (i.e., parameter "ITEM_TYPE_CODE") is a parameter that the workflow process rule can use when determining whether to send the work item to the BG queue 3030. For example, all work item related to the benefits guide 103 can have a value of "OPTREQ" for this parameter and in that case, that value would trigger a copy. Similarly, the product ID code (i.e., parameter "PROD_ID_C") is a parameter that the workflow process rule can use when determining whether to send the work item to the BG queue 3030. For example, the value for this parameter is the database in which the source is stored. All work items related to the benefits guide 103 can have a value of DB, DC, HI, and PR.

These parameters also identify the specific content elements that are being changed by the work item. The parameters identify the plan name, subject code, page ID, and section name.

When the system 100 is generated content for viewing, the system 100 queries the IDB 3006 to find out if there are any parameters with the same values of the content being generated. If there is a match, the system 100 applies the pending change indication at the appropriate section in the displayed page.

Workflow process 218A closes a work item when the change has been tested and put into production (e.g., the change has been incorporated into the repository 103*b*). Workflow process 218A can also close a work item when it is not desired, for example, when a user (e.g., a CSM user 134) does not authorize the change because the change is not necessary or incompatible in some way with a client's instructions. As a work item is closed, the delete listener 3043 deletes the values for that work item from the IDB 3006. In one example, the delete listener 3043 periodically (e.g., at a period set by configuration) checks the status of the work items in the BG queue 3030 to determine if any of them have changed to a closed status (e.g., status code=RESOLV). Using these processes, the data in the IDB 3006 represents the currently pending changes in the workflow process 218, with a tolerance of the period set by the configuration. The system 100 simply has to query the IDB 3006 to obtain a quick indication of whether a particular page/section in the generated display has an associated change currently pending.

For example, using the screen shot 2800 (FIG. 28), Table 7 and Table 8 include values for the parameters of Table 6 that are stored in the IDB 3006 while the two change requests are pending (e.g., status code=INPROC (in process)).

TABLE 7

| Data Element | Variable value |
|---|---|
| ITEM_TYPE_CODE | OPTREQ |
| CLNT_ID_N | XX8052 |
| PROD_ID_C | HR |
| BENF_GUID_PLAN_NM | ABC Corp's 401(k) Plan For Salaried Employees |
| SUBJ_C | Retirement Savings |
| PAGE_ID_X | HRPR_401k_payout |
| SCTN_X | Approval |
| WORK_ITEM_ID | 123456654321 |
| STAT_C | INPROC |

TABLE 8

| Data Element | Variable value |
|---|---|
| ITEM_TYPE_CODE | OPTREQ |
| CLNT_ID_N | XX8052 |
| PROD_ID_C | HR |
| BENF_GUID_PLAN_NM | ABC Corp's 401(k) Plan For Salaried Employees |
| SUBJ_C | Retirement Savings |
| PAGE_ID_X | HRPR_401k_payout |
| SCTN_X | Approval |
| WORK_ITEM_ID | 123456655555 |
| STAT_C | INPROC |

As the system 100 processes the request to generate the display of screen shot 2800, the system 100 determines (or has already determined) that the content needed is for client number XX8052, the content is stored in the HRPR database 106*d*, the name of the plan is ABC Corp's 401(k) Plan For Salaried Employees, the subject is Retirement Savings, and the page being requested is defined using the template HRPR__401k_payout. While generating the page to be displayed, the system queries the IDB 3006 and the IDB returns the data in Tables 7 and 8. Using this returned data, the system 100 adds a pending change indicator when generating the section "Approval" in the display in screen shot 2800.

When the indicator 2803 is selected by the user viewing the content, the system 100 displays a description window describing the pending changes. To perform this part, the system 100 uses the work item IDs that were returned in response to the query (e.g., 123456654321 and 123456655555). The system 100 uses the work item identifiers to obtain a description directly from the workflow process 218 (e.g., using an API). With the unique IDs for the specific work items, searching the work items through the workflow process 218 can be efficient and quick. This process advantageously allows the description to be changed as needed as the work item is moved in the workflow process 218 and enables the system 100 to display the most current description available. Further, when the work item is closed, the system 100 no longer displays the pending change indicator on the page, as the data is removed from the IDB 3006 and nothing returned on subsequent queries.

In other examples, alternatives to the system 3000 are used to implement indicating the pending changes. Some of these alternatives are described now only as illustrative examples and not to limit the alternatives in any way. For example, as an alternative to the BG queue 3030, the BG work item servlet 3040 and the delete listener 3043 can monitor each queue (3018, 3021, 3024, and 3027) individually and apply rule logic similar to the rules described above to determine whether the data (e.g., Table 6) for a work item should be transferred to the IDB 3006 while the work item is pending. The BG queue 3030 can be moved so that all of the work items flow through the BG queue 3030 first and the BG queue 3030 transfers the work items to the other appropriate queues (e.g., 3018, 3021, 3024, and/or 3027). The description for the change can be stored in the IDB 3006. This advantageously eliminates the need for the system 100 to query the workflow process 218 when generating a description of the changes. This requires that the description in the IDB be updated when it is changed in the workflow process 218.

Quality Control

The system 100 includes the quality control module 206 to track and control the movement of changes through the system 100. The quality control module 206 can have its own associated database (not shown) to keep information that the quality control module 206 uses in controlling quality of the process. Such information can include, for example, the work item identifier (e.g., the unique ID), the subject of the content being changed, the date and time information of the change request, the type of the content, the status of the change request, the owner of the change request, and a brief description of the change request. The information can also include the availability of the content, such as whether the content is in the centralized database available to be checked out or is already checked out by another user making a change. The quality control module 206 generates a user interface that displays this information and can be used to enable users to enter and/or update this information. In some examples where the same data is used by the QCDB (206) and the workflow process (218), that information can be automatically passed between the two (e.g., changes in status).

Figure 31:
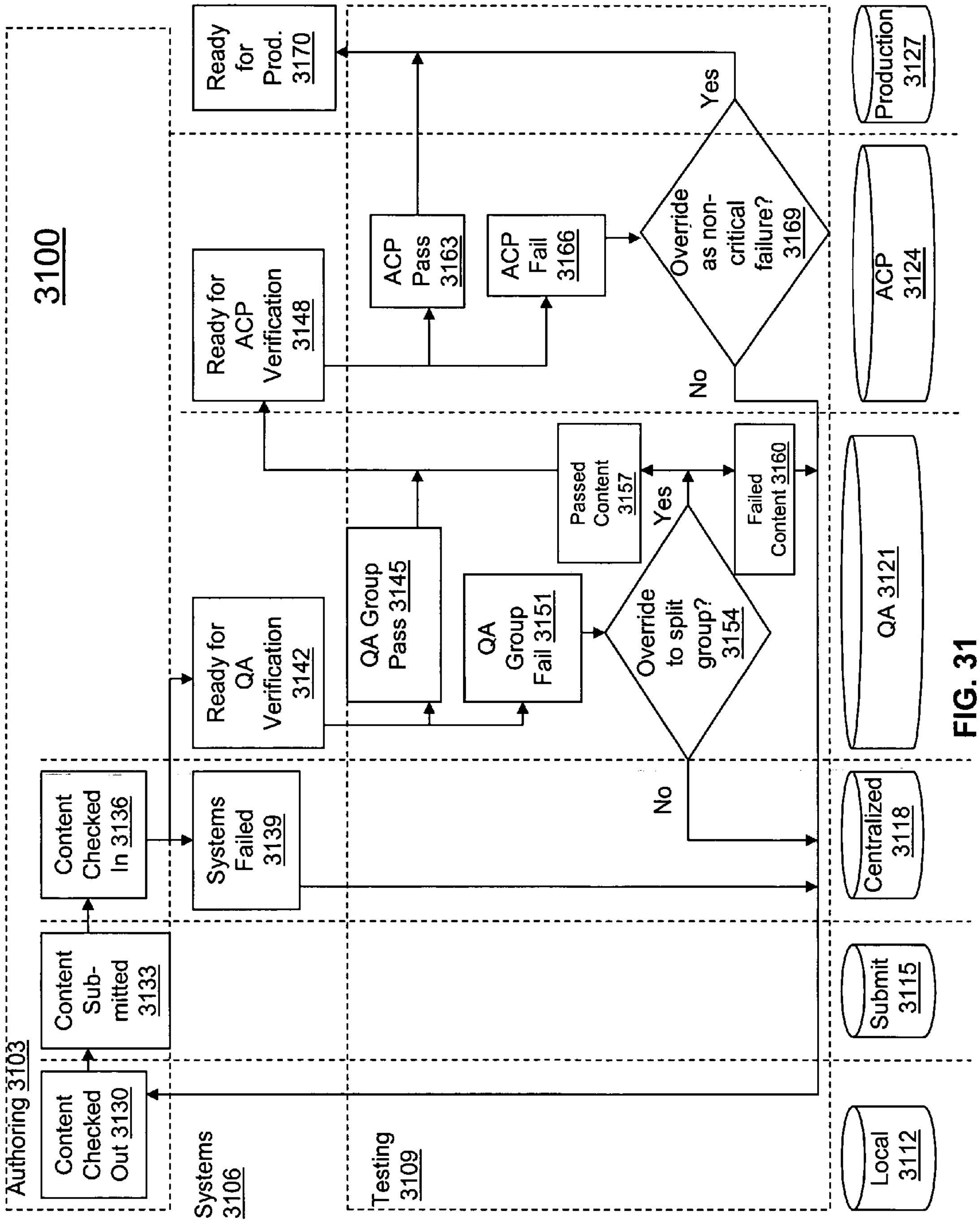
FIG. 31 is a process diagram showing a quality control process of a change to content.

FIG. 31 illustrates an exemplary process 3100 showing the flow of a change from content modification to the release to production, with a focus on the testing portion of the routing. The process 3100 has a role division that includes an authoring role 3103, a systems role 3106, and a testing role 3109. The authoring role 3103 represents a user that is making a change to the content. As described above (e.g., the process 2700), an author can be, for example, a CSS user 121, a SDS user 131, a CSM user 134 and/or a content author 141. The systems role 3106 represents, for example, the SSD user 144. The testing role 3109 represents a user that is testing a change to the content. A testing user can be, for example, a quality assurance (QA) tester and/or an acceptance (ACP) tester. In the process 3100, a QA tester is responsible for testing at the QA stage and an ACP tester is responsible for testing at the ACP stage. For example, QA can represent a "dirtier" version of content from ACP, with more work-in-progress in QA, and ACP can represent the final just-before-production stage. In examples where there is an all or nothing approach that goes to production (e.g., from ACP), if something fails the quality check in ACP, it needs to be flagged or there will be an error in production the next day.

The process 3100 also has a location division that includes a local database 3112, a submit database 3115, a centralized database 3118, a QA database 3121, an ACP database 3124, and a production database 3127. These databases are used to move the changed content through the change process to different groups of users involved with the process 3100. Although the process 3100 uses databases, in other examples, the locations are not databases, but particular file locations on a network to which the changes can be stored as they move through the change process. Further, other examples may not use as many individual locations. For example, the local database 3112 and the submit database 3115 can be combined into the centralized database 3118, the QA database 3121 can be combined with the ACP database 3124, or there can be a single centralized database from which all users access the changes.

An author making a change to content checks out (3130) the content that she is modifying. In the process 3100, checking out (3130) the content includes transferring the content from the centralized database 3118 to the local database 3112 associated with that author. As described above, when an author is done making the changes to the content, she transfers (3133) the content to the submit database 3115 and changes a status (e.g., in the workflow process 218 or the quality control module 206, which can automatically update the workflow process 218) to "Content Submitted". When the author changes the status, the system 100 checks in (3136) the changed content, which includes transferring the changed content from the submit database 3115 to the centralized database 3118. When the content is checked in (3136), the systems user verifies that the content objects identified to be moved exist in the database in the location specified (e.g., if manual entry is involved, verify there are no mistakes). If this verification fails (3139), the changed content is flagged as failed (e.g., the value of a parameter associated with the change is marked failed, or the system failed).

If the systems verification passes, then the systems user changes (3142) the status of the changed content to a status representing the change content is ready for QA verification. When the systems user changes the status, the system 100 queues and transfers the changed content from the centralized database 3118 to the QA database 3121. Content elements have relationships to other content elements. The relationship can be, for example, that certain content elements are included in other content elements. In other examples, the relationship can be that all of the content elements are part of the same subject, such as all the content elements related to the subject "air travel" for a particular policy. A group relationship can also be multiple change requests to the same content element.

The system 100 moves the changed content and the related content (e.g., all of the content elements for the same subject) as a group to the QA database 3121. This advantageously allows a QA user to see the changed content in context with related content elements to ensure that the change does not inadvertently affect one of the related content elements. Further, since the system 100 allows different authors to work on related content elements, this advantageously allows a QA user to the different changes to related content to ensure that the different changes do not inadvertently conflict with each other. When reviewing the group of related content elements, if the QA user determines that all of the content elements are acceptable, the QA user indicates (3145) that each of the content elements in the related group passes QA verification. In that case, the QA user changes (3148) the status of each of the changed content elements to a status (e.g., QA Verified) representing the changed content is ready for ACP verification. When the QA user changes the status, the system 100 queues and transfers the changed content from the QA database 3121 to the ACP database 3124.

If the QA user determines that one or more of the content elements are not acceptable, the QA user indicates (3151) which of the content elements in the related group fails QA verification. In that case, some of the content elements are marked as passed (e.g., their status is changed to "QA Verified") and some of the content elements are marked as failed (e.g., their status is changed to "QA Failed"). If one of the content elements of the group of related content elements is marked as failed, then the default is that the system 100 does not transfer any of the content elements in that group to the next location (i.e., the ACP database 3124). The system 100 includes an override process that enables the content elements of the group that are marked as passed (e.g., "QA Verified") to be transferred.

In one example, the user interface generated by the quality control module 206 described above includes a listing of the group of content elements and the status (e.g., "QA Verified" or "QA Failed"). The listing includes an element (e.g., a check box) that enables a QA user to override the restriction of not allowing any content element in the group to progress in the process 3100. For a change to a content element that has passed (e.g., "QA Verified"), the user selects a checkbox with the status "QA Override" to indicate to the system 100 that this passed content element can be moved independently from the group. A user may override the group restriction when, for example, the passed content element does not have an object dependency with the content element that has failed.

The user interface displays an indicator (e.g., a yellow check mark) next to the status (e.g., "QA Verified") of the content element that has passed. This indicator identifies that this content element has been overridden and allowed to progress through the process 3100 without one of its related content elements from the group. The system 100 can impose a security restriction, for example, allowing only those users who are associated with a QA approver role to be able to access the override check box and select it.

When a user selects an override, the system 100 determines (3154) that that particular content element can be split from the group and moved (3157) to the next approval stage (e.g., ACP verification). The system 100 transfers (3160) those content elements that have failed (e.g., their status is "QA Failed") back to the centralized database 3118 and notifies the author (e.g., by sending an email) that the change has failed and needs to be modified.

If the QA verification passes, then the group (3145) or those individual content elements that have been overridden (3157) are transferred (3148) to the ACP database 3124 and are ready for ACP verification. The ACP user verifies each of the content elements and indicates whether the ACP verification has passed (3163) (e.g., sets the status to "ACP Verified") or failed (3166) (e.g., sets the status to "ACP Failed"). For failure conditions, the ACP user can differentiate between a critical failure (e.g., the change to the content element is incorrect) and a non-critical failure (e.g., the change contains a typographical error). The status of a non-critical failure can be indicated as "ACP Failed Non-Critical".

Similar to the QA override, the user interface generated by the quality control module 206 includes a listing of the group of content elements and the status (e.g., "ACP Verified", "ACP Failed" or "ACP Failed Non-Critical"). The listing includes an element (e.g., a check box) that enables an ACP user to override a non-critical failure and allow the failed content element to progress in the process 3100. The system 100 uses the check box selection to determine (3169) whether an ACP failure can be overridden. For a change to a content element that has a non-critical failure (e.g., "ACP Failed Non-Critical"), the user selects a checkbox with the status "ACP Failed Non-Critical Manager Approval" to indicate to the system 100 that this failed content element can be moved into production even though there is an associated failure. An ACP user may override the failure when, for example, the content element has some important changes in it, such as a new requirement, which outweigh the reason it failed, such as an identified typographical error. The user interface displays an indicator (e.g., a green check mark) next to the status (e.g., "ACP Failed Non-Critical Manager Approval") of the content element that has failed. This indicator identifies that this content element has been overridden and allowed to progress through the process 3100 even though it has a failure. The system 100 can impose a security restriction, for example, allowing only those users who are associated with an ACP approver role to be able to access the override check box and select it.

After the overridden failed content element goes through the production cycle (3170), the system 100 does not close out the change request. Instead, the system 100 changes the indicator (e.g., green check mark) to a different indicator (e.g., a red check mark) to indicate to the author that the change has gone through production but has an ACP failure that must be addressed before the change request can be closed. The system 100 can automatically notify the author (e.g., by sending an email) that the change has been through production and needs to be addressed before the change request can be closed. In some examples, the system 100 notifies the applicable users each time a status changes and/or a change is transferred from one database to another. This automatic notification advantageously allows the applicable users to become aware of the changes without periodically having to check the quality control module 206 (e.g., using the user interface generated by the quality control module 206).

The above-described processes can be implemented in digital electronic circuitry, or in computer hardware, firmware, software, or in combinations of them. The implementation can be as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the invention by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described processes can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described processes can be implemented in a distributed computing the system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing the system can include clients and servers. A client and server are generally remote from each other and typically interact through a communication network. The relationship of client and server arises by virtue of computer programs running on the respective computers and having a client-server relationship to each other.

The invention has been described in terms of particular embodiments. The alternatives described herein are examples for illustration only and not to limit the alternatives in any way. The steps of the invention can be performed in a different order and still achieve desirable results. Other embodiments are within the scope of the following claims.

What is claimed is:

1. A computer implemented method for quality control of content authored in a benefits content system, the method comprising:

receiving, by a computing device, a request in a work flow process to change a portion of the content authored in the benefits content system, the portion of the content including a plurality of content elements;

determining, by the computing device, whether the portion passes a quality check;

if the portion passes the quality check, moving, by the computing device, the request to a next step in the work flow process; and otherwise, if the portion fails the quality check:

dividing, by the computing device, the plurality of content elements of the portion of content into one or more passed content elements and one or more failed content elements;

moving, by the computing device, the one or more passed content elements to the next step in the work flow process; and preventing, by the computing device, the one or more failed content elements from moving to the next step in the work flow process.

2. The method of claim 1 further comprising publishing, by the computing device, the one or more passed content elements in the benefits content system.

3. The method of claim 1 further comprising returning, by the computing device, the one or more failed content elements to a content author.

4. The method of claim 1 further comprising automatically transmitting, by the computing device, an electronic message to a content author associated with the request in response to the request having a change in status after determining whether the portion passes the quality check.

5. The method of claim 4 wherein the electronic message is an email.

6. A computer program product, tangibly embodied in a non-transitory machine readable storage medium, for quality control of authoring work flow within a benefits content system, the computer program product including instructions being operable to cause data processing apparatus to:

receive, by a computing device, a request in a work flow process to change a portion of the content authored in the benefits content system, the portion of the content including a plurality of content elements;

determine, by the computing device, whether the portion passes a quality check;

if the portion passes the quality check, move, by the computing device, the request to a next step in the work flow process; and otherwise, if the portion fails the quality check:

divide, by the computing device, the plurality of content elements of the portion of content into one or more passed content elements and one or more failed content elements;

move, by the computing device, the one or more passed content elements to the next step in the work flow process; and prevent, by the computing device, the one or more failed content elements from moving to the next step in the work flow process.

7. The computer program product of claim 6 further including instructions being operable to cause the data processing apparatus to publish the one or more passed content elements in the benefits content system.

8. The computer program product of claim 6 further including instructions being operable to cause the data processing apparatus to return the one or more failed content elements to a content author.

9. A system for quality control of authoring work flow within a benefits content system, the system comprising a computing device configured to:

receive, by a computing device, a request in a work flow process to change a portion of the content authored in the benefits content system, the portion of the content including a plurality of content elements;

determine, by the computing device, whether the portion passes a quality check;

if the portion passes the quality check, move, by the computing device, the request to a next step in the work flow process; and otherwise, if the portion fails the quality check:

divide, by the computing device, the plurality of content elements of the portion of content into one or more passed content elements and one or more failed content elements;

move, by the computing device, the one or more passed content elements to the next step in the work flow process; and prevent, by the computing device, the one or more failed content elements from moving to the next step in the work flow process.

10. The system of claim 9 wherein the computing device is further configured to publish the one or more passed content elements in the benefits content system.

11. The system of claim 9 wherein the computing device is further configured to return the one or more failed content elements to a content author.

* * * * *